(12) United States Patent
Boyer et al.

(10) Patent No.: US 7,569,107 B2
(45) Date of Patent: *Aug. 4, 2009

(54) TREATED FILLER AND PROCESS FOR PRODUCING

(75) Inventors: James L. Boyer, Monroeville, PA (US); Charles R. Coleman, Pittsburgh, PA (US); Timothy A. Okel, Trafford, PA (US); Narayan K. Raman, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 400 days.

This patent is subject to a terminal disclaimer.

(21) Appl. No.: 11/442,518

(22) Filed: May 26, 2006

(65) Prior Publication Data

US 2006/0281009 A1 Dec. 14, 2006

Related U.S. Application Data

(63) Continuation-in-part of application No. 11/103,030, filed on Apr. 11, 2005, and a continuation-in-part of application No. 11/103,123, filed on Apr. 11, 2005, and a continuation-in-part of application No. 11/103,316, filed on Apr. 11, 2005.

(51) Int. Cl.
*C04B 14/04* (2006.01)
*C08K 9/00* (2006.01)

(52) U.S. Cl. ............... 106/481; 106/499; 106/490; 106/491; 106/504; 523/200; 523/216; 524/492; 429/247

(58) Field of Classification Search ......... 106/481–483, 106/499, 490–491, 504; 523/200, 216; 524/492; 429/247

See application file for complete search history.

(56) References Cited

U.S. PATENT DOCUMENTS

| 3,351,495 | A |   | 11/1967 | Larsen et al. |
|---|---|---|---|---|
| 3,867,326 | A | * | 2/1975 | Rivin et al. ............... 524/612 |
| 3,873,489 | A |   | 3/1975 | Thum et al. |
| 3,902,915 | A |   | 9/1975 | Crawford et al. |
| 4,237,083 | A |   | 12/1980 | Young et al. |
| 4,310,444 | A | * | 1/1982 | Hamada et al. ............ 524/322 |
| 4,336,219 | A |   | 6/1982 | Lamond |
| 4,530,959 | A |   | 7/1985 | Armbruster et al. |
| 4,616,065 | A |   | 10/1986 | Hargis et al. |
| 4,748,199 | A |   | 5/1988 | Takiguchi et al. |
| 4,866,131 | A |   | 9/1989 | Fujimaki et al. |
| 4,894,420 | A |   | 1/1990 | Scriver |
| 4,925,894 | A |   | 5/1990 | Futamura |
| 5,034,207 | A |   | 7/1991 | Kerner et al. |
| 5,082,901 | A |   | 1/1992 | Linster |
| 5,123,964 | A |   | 6/1992 | Kerner et al. |
| 5,162,409 | A |   | 11/1992 | Mroczkowski |
| 5,580,919 | A |   | 12/1996 | Agostini et al. |
| 7,070,749 | B2 |   | 7/2006 | Lindner et al. |
| 2003/0130401 | A1 | * | 7/2003 | Lin et al. ............... 524/492 |
| 2005/0203238 | A1 | * | 9/2005 | Zhou et al. ............... 524/492 |
| 2006/0048678 | A1 |   | 3/2006 | Craig |

FOREIGN PATENT DOCUMENTS

DE     WO 2004/014796     *   2/2004

OTHER PUBLICATIONS

Periods 2, 3, 4, 5 and 6 of Groups Ib, IIb, IIIa, IIIb, IVa, IVb (except carbon), Va VIa VIIa and VIII of the Periodic Table of the Elements in *Advanced Inorganic Chemistry; A Comprehensive Text* by F. Albert Cotton, et al., Fourth Edition, John Wiley and Sons, 1980.
French Standard Method (French Standard NFT 45-007, Primary Materials for the Rubber Industry: Precipitated Hydrated Silica, Section 5.12, Method A., pp. 64-71, Nov. 1987).
Kirk Othmer Encyclopedia of Chemical Technology, Fourth Edition, 1996, vol. 19, pp. 881-904.
Apparent Tamped Density Test Method in ISO 787/11, "General Method of Tests for Pigments and Extenders—Part 11: Determination of Tamped Volume and Apparent Density After Tamping", First Edition, Oct. 1, 1981.
"Method 3051: Microwave Assisted Acid Digestion of Sediments, Sludges, Soils and Oils," under Section 7: Calibration of Microwave Equipment, U.S. Environmental Protection Agency, SW-846, Version 2, Dec. 1997.
*Advanced Inorganic Chemistry: A Comprehensive Text* by F. Albert Cotton et al., Fourth Edition, John Riley and Sons, 1980.
Template Based Approaches to the Preparation of Amorphous, Nanoporous Silicas, Chemistry of Materials (Aug. 1996) vol. 8, No. 8, p. 1682.
ASTM D1993-91 "Standard Test Method for Precipitated Silica-Surface Area by Multipoint BET Nitrogen Adsorption".
ASTM D-2084-01 Standard Test Method for Rubber Property-Vulcanization Using Oscillating Disk Cure Meter.
ASTM D 1054-91 (2000) "Standard Test Method for Rubber Property-Resilience Using a Rebound Pendulum".
ASTM D 1646-00 part A "Standard Test Methods for Rubber-Viscosity, Stress Relaxation, and Pre-Vulcanization Characteristics (Mooney Viscometer)".
ASTM D5289-95 "Standard Test Method for Rubber Property-Vulcanization Using Rotorless Cure Meters".
ASTM D-412-98a (Reapproved 2002) "Standard Test Methods for Vulcanized Rubber and Thermoplastic Elastomers-Tension".
ASTM D 5963-97A (2001) "Standard Test Method for Rubber Property-Abrasion Resistance (Rotary Drum Abrader)".
ASTM E-11-04 "Standard Specification for Wire Cloth And Sieves for Testing Purposes".

* cited by examiner

*Primary Examiner*—Michael A Marcheschi
*Assistant Examiner*—Pegah Parvini
(74) *Attorney, Agent, or Firm*—Frank P. Mallak; Deborah M. Altman

(57) ABSTRACT

The present invention is related to treated filler and processes for producing said treated filler. Untreated filler slurry can be treated with a treating material and, optionally, a coupling material and then subjected to conventional drying method(s), to produce the treated filler of the invention. Treated filler has a wide variety of applications including but not limited to battery separators and rubber compositions such as tires.

22 Claims, No Drawings

TREATED FILLER AND PROCESS FOR PRODUCING

CROSS-REFERENCE TO RELATED APPLICATIONS

This application is a continuation-in-part of U.S. patent application Ser. Nos. 11/103030; 11/103123; and 11/103316, each filed on Apr. 11, 2005.

FIELD OF INVENTION

The present invention is related to treated filler and processes by which it can be produced. Untreated filler slurry can be treated with a treating material and/or a coupling material and then subjected to conventional drying method(s), to produce the treated filler of the invention. The treated filler has a wide variety of applications including but not limited to battery separators and in polymeric compositions, for example rubber compositions such as tires.

BACKGROUND OF THE INVENTION

As previously mentioned, in an embodiment of the invention the treated filler can be used in the manufacture of battery separators. Battery separators are microporous sheets that can be inserted between oppositely charged electrode plates in a lead/sulfuric acid battery. These microporous separators can prevent direct contact of the oppositely charged electrode plates and have sufficient porosity to allow ionic conductivity through the electrolyte (low electrical resistance). The separator should have sufficient puncture strength to prevent the creation of holes via punctures from sharp edges of other battery elements such as grids. Holes in a separator can lead to direct contact with time. Lowering the electrical resistivity and/or reducing the risk of punctured holes in the battery separator between the electrode plates can improve the reliability and flexibility in battery design and manufacture. Battery separator methods of manufacture are disclosed, for example, in U.S. Pat. Nos. 3,351,495 and 4,237,083.

In the production of polymeric compositions, it is common to incorporate fillers to improve the physical properties of the polymeric composition. The surfaces of such fillers are often modified to increase the reactivity and consequently the two and three-dimensional coupling of the filler within the polymeric composition. It is conventional in the rubber industry to incorporate carbon black and other reinforcing fillers into natural and synthetic rubber to increase the physical properties of the cured rubber vulcanizate. Fillers used to reinforce such polymeric compositions include natural and synthetic fillers.

One of the principal non-black fillers used in the rubber industry is amorphous precipitated silica. This siliceous filler is used to impart improved tensile strength, tear resistance and abrasion resistance to the rubber vulcanizate. Silica fillers are also used in combination with carbon blacks to obtain maximum mileage in passenger vehicle tires and off-the-road tires, e.g., tires for mining and logging operations and for road-building equipment. Such applications have become well established. When used as the sole reinforcing filler, silica fillers that are not well dispersed and/or coupled in the rubber do not provide the overall improved performance obtained by the use of carbon blacks alone. This is observed most readily in rubber vulcanizes used for tires, e.g., tire treads.

Various coupling materials, e.g., titanates, zirconates and silanes, have been suggested for use with silica fillers when such fillers are incorporated into polymeric compositions, e.g., rubber, in order to improve the performance of the rubber vulcanizate. Among the various organosilane coupling materials suggested for such use are the mercaptoalkyltrialkoxysilanes, e.g., mercaptopropyltrimethoxysilane, and the bis (alkoxysilylalkyl)polysulfides, e.g., 3,3'-bis(triethoxysilylpropyl)tetrasulfide. The use of appropriate amounts of such coupling materials in siliceous filler-reinforced synthetic rubbers can provide at least equivalent performance to carbon black-reinforced synthetic rubbers in several key physical properties such as 300% modulus, tensile strength and abrasion resistance.

The high cost of various organosilanes, the irritating odors associated with some of the materials, the time and energy to mix them into and react with the filler in rubber and the alcohol generated by some of the materials can deter the more general use of siliceous fillers as the principal reinforcing filler in large volume rubber applications.

One drawback in using alkoxysilanes as coupling materials for silica fillers is their tendency to produce off-gases. In particular, hydrolysis of the alkoxy group(s) can result in the release of alcohol. In some cases the alkoxysilane and silica filler can be separately added directly to the rubber composition. In other cases the alkxoysilane can be first added to a siliceous filler that can be subsequently added to the rubber composition. In either case the hydrolysis of the available alkoxy groups can result in the release of alcohol some of which can be retained in the surrounding elastomer matrix. The portion of the alcohol retained in the surrounding elastomer matrix can result in porous zones or blisters which can form surface defects in the resulting formed rubber articles and/or can impair the dimensional stability of treads during extrusion and tire building. As a result, a low tread strip drawing speed should be maintained to conform with specifications, which can result in a decrease in production and concomitant increase in costs. The portion of the alcohol not retained in the surrounding elastomer matrix can create issue regarding the release of volatile organic compounds (VOC). This evolution and off gassing of alcohol can continue through the life of a product manufactured from an elastomer compounded with alkoxysilane coupling materials.

Bis(alkoxysilylalkyl)-polysulfides sometimes are used in place of mercaptoalkyltrialkoxysilanes to substantially reduce or minimize the associated irritating odors and scorch issues. Preparation of silica filled rubber compositions using bis(alkoxysilylalkyl)-polysulfides generally are performed within narrow temperature operating ranges. The mixing temperature should be high enough to permit the silica-silane reaction to take place rapidly but low enough to substantially preclude an irreversible thermal degradation of the polysulfane function of the coupling material and premature curing (scorch) of the rubber mixture. These limitations can result in decreased production and increased expense to achieve the desired dispersion of the silica throughout the rubber matrix. These limitations also can result in the retention in the rubber mixture of unreacted alkoxysilyl groups that can be available to further react during subsequent stages which can result in an undesirable increase in the compound viscosity, and a shorter shelf life. Moreover, the continuing reaction in the compound can evolve more (unevaporated) alcohol, can result in the alcohol related issues discussed in the previous paragraph.

SUMMARY OF THE INVENTION

The present invention includes a process for producing treated filler which comprises treating a slurry comprising untreated filler wherein said untreated filler has not been previously dried, with a treating material and, optionally, a coupling material wherein the treating material is chosen from anionic, nonionic and amphoteric surfactants and mixtures thereof, and wherein the treating material is present in an amount of from greater than 1% to 25% by weight of untreated filler, to produce a treated filler slurry; and drying the treated filler slurry using conventional drying techniques.

The invention also relates to treated fillers, to battery separators comprising the treated fillers, and to rubber compounds and tires comprising the treated fillers.

DETAILED DESCRIPTION OF THE INVENTION

For the purposes of this application, unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

All numerical ranges herein include all numerical values and ranges of all numerical values within the recited ranges. Notwithstanding the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

As used herein and the claims in reference to filler (i.e., treated and/or untreated), the term "not been previously dried" means filler that has not been dried to a moisture content of less than 20 percent by weight. In a non-limiting embodiment, untreated filler for use in the present invention does not include filler that has been previously dried to a moisture content of less than 20 percent by weight. In another non-limiting embodiment, untreated filler for use in the present invention does not include filler that has been previously dried to a moisture content of less than 20 percent by weight and rehydrated.

As used herein and the claims, the term "filler" means an inorganic oxide that can be used in a polymer to essentially improve at least one property of said polymer, such as but not limited to electrical resistance (ER10) and puncture resistance. The electrical resistance values used herein and the claims were measured in accordance with the procedure set forth in the Examples to determine ER10. The puncture resistance values used herein and the claims were measured in accordance with the procedure set forth in the Examples. As used herein and the claims, the term "untreated filler" means a filler that has not been treated with a treating material comprising anionic, nonionic and amphoteric surfactants and mixtures thereof in an amount of greater than 1% by weight of the filler. As used herein and the claims, the term "slurry" means a mixture including at least filler and water.

In the present invention, alkali metal silicate can be combined with acid to form untreated filler slurry; the untreated filler slurry can be treated with a treating material and, optionally, a coupling material to produce treated filler slurry; and the treated filler slurry then can be dried using conventional drying techniques known in the art to produce the treated filler of the present invention. In a non-limiting embodiment, untreated filler slurry can include untreated filler that has not been previously dried. In still another non-limiting embodiment, untreated filler slurry can include untreated filler that has not been previously dried and then rehydrated.

Suitable untreated fillers for use in preparing the treated filler of the present invention can include a wide variety of materials known to one having ordinary skill in the art. Non-limiting examples can include inorganic oxides such as inorganic particulate and amorphous solid materials which possess either oxygen (chemisorbed or covalently bonded) or hydroxyl (bound or free) at an exposed surface, such as but not limited to oxides of the metals in Periods 2, 3, 4, 5 and 6 of Groups Ib, IIb, IIIa, IIIb, IVa, IVb (except carbon), Va, VIa, VIIa and VIII of the Periodic Table of the Elements in *Advanced Inorganic Chemistry: A Comprehensive Text* by F. Albert Cotton et al, Fourth Edition, John Wiley and Sons, 1980. Non-limiting examples of suitable inorganic oxides can include but are not limited to aluminum silicates, silica such as silica gel, colloidal silica, precipitated silica, and mixtures thereof.

In a non-limiting embodiment, the inorganic oxide can be silica. In alternate non-limiting embodiments, the silica can be precipitated silica, colloidal silica and mixtures thereof. In further alternate non-limiting embodiments, the silica can have an average ultimate particle size of less than 0.1 micron, or greater than 0.001 micron, or from 0.01 to 0.05 micron, or from 0.015 to 0.02 micron, as measured by electron microscope. In alternate non-limiting embodiments, the silica can have a surface area of from 25 to 1000 square meters per gram, or from 75 to 250 square meters per gram, or from 100 to 200 square meters per gram. The surface area can be measured using conventional techniques known in the art. As used herein and the claims, the surface area is determined by the Brunauer, Emmett, and Teller (BET) method in accordance with ASTM D1993-91. The BET surface area can be determined by fitting five relative-pressure points from a nitrogen sorption isotherm measurement made with a Micromeritics TriStar 3000™ instrument. A FlowPrep-060™ station provides heat and a continuous gas flow to prepare samples for analysis. Prior to nitrogen sorption, the silica samples are dried by heating to a temperature of 160° C. in flowing nitrogen (P5 grade) for at least one (1) hour.

The untreated filler for use in the present invention can be prepared using a variety of methods known to those having ordinary skill in the art. In a non-limiting embodiment, silica for use as untreated filler can be prepared by combining an aqueous solution of soluble metal silicate with acid to form a silica slurry; the silica slurry can be optionally aged; acid or base can be added to the optional aged silica slurry; the silica slurry can be filtered, optionally washed, and then dried using conventional techniques known to a skilled artisan.

Suitable metal silicates can include a wide variety of materials known in the art. Non-limiting examples can include but are not limited to alumina, lithium, sodium, potassium silicate, and mixtures thereof. In alternate non-limiting embodiments, the metal silicate can be represented by the following structural formula: $M_2O(SiO_2)_x$ wherein M can be alumina, lithium, sodium or, potassium, and x can be an integer from 0.1 to 4.

Suitable acids can be selected from a wide variety of acids known in the art. Non-limiting examples can include but are not limited to mineral acids, organic acids, carbon dioxide and mixtures thereof.

Silica slurry formed by combining metal silicate and acid can be treated with a "treating material" or "non-coupling material". It should be understood that for purposes of the present invention the terms "treating material" and "non-coupling material" may be used interchangeably both in the written description portion and in the claims. Also, as used herein and in the claims, the term "non-coupling material" means a material that essentially does not covalently bond to the polymeric composition in which it is used. Suitable treating materials or non-coupling materials for use in the present invention can include anionic, nonionic and amphoteric surfactants, and mixtures thereof Non-limiting examples of anionic surfactants can include but are not limited to fatty acids and salts of fatty acids that can be substantially soluble or substantially emulsifiable in water having the general formula,

wherein Z can represent H, Na, K, Li or NH$_4$, and R can represent straight chain or branched C$_5$ to C$_{22}$ alkyl; alkyl sarcosinic acids and salts of alkyl sarcosinic acids having the general formula,

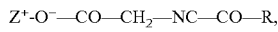

wherein Z can represent H, Na, K, Li or NH$_4$; and R can represent straight chain or branched C$_5$ to C$_{22}$ alkyl.

Further non-limiting examples of suitable anionic surfactants for use in the present invention can include sodium stearate, ammonium stearate, ammonium cocoate, sodium laurate, sodium cocyl sarcosinate, sodium lauroyl sarcosinate, sodium soap of tallow, sodium soap of coconut, sodium myristoyl sarcosinate, stearoyl sarcosine acid, and mixtures thereof.

Non-limiting examples of anphoteric surfactants can include but are not limited to amphoacetate glycines having the following general formula,

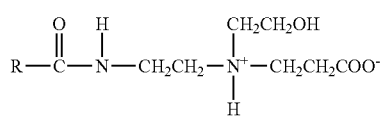

wherein R can represent straight chain or branched C$_5$ to C$_{22}$ alkyl; alkyl betaines having the following general formula,

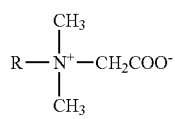

wherein R can represent straight chain or branched C$_5$ to C$_{22}$ alkyl; alkylamido betaines having the following general formula,

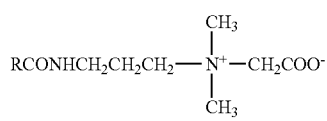

wherein R can represent straight chain or branched C$_5$ to C$_{22}$ alkyl; sulfo-betaines having the following general formula,

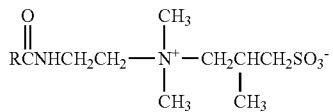

wherein R can represent straight chain or branched C$_5$ to C$_{22}$ alkyl; phospho-betaines having the following general formula,

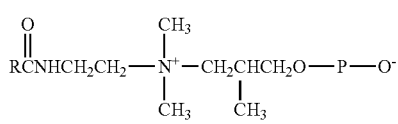

wherein R can represent straight chain or branched C$_5$ to C$_{22}$ alkyl; amphopropionates having the following general formula,

wherein R can represent straight chain or branched C$_5$ to C$_{22}$ alkyl; and mixtures thereof.

In alternate non-limiting embodiments, the amphoteric surfactant can be chosen from 3-(decyldimethylammonio)propanesulfonate inner salt, 3-(dodecyldimethylammonio)propanesulfonate inner salt, 3-(N,N-dimethylmyristylammonio)propanesulfonate, 3-(N,N-dimethyloctadecylammonio) propanesulfonate, 3-(N,N-dimethyloctadecylammonio) propanesulfonate inner salt, 3-(N,N-dimethylpalmitcylammonio)propanesulfonate, and mixtures thereof.

Non-limiting examples of nonionic surfactants for use in the present invention can include but are not limited to polyethylene oxide alkyl ethers wherein the alkyl group can be straight chain or branched having a chain length of from C$_6$ to C$_{22}$; polyethylene oxide alkyl esters wherein the alkyl group can be straight chain or branched having a chain length of from C$_6$ to C$_{22}$; organic amines with straight or branched carbon chains from C$_6$ to C$_{22}$ having the general formula R*N R'R" wherein R* can be from C$_8$ to C$_{22}$ alkyl and R' and R" can each independently be H or C$_1$ to C$_4$ alkyl such that the molecule can be substantially soluble or substantially emulsifiable in water, such as but not limited to octadecylamine; tertiary amines with carbon chains from C$_6$ to C$_{22}$; polyethyleneimines; polyacrylamides; glycols and alcohols with straight chain or branched alkyl from C$_6$ to C$_{22}$ that can form ester linkage (—SiOC—), polyvinyl alcohol; and mixtures thereof.

In alternate non-limiting embodiments the nonionic surfactant can be chosen from polyethylene oxide ethers such as but not limited to hexaethylene glycol monododecylether, hexaethylene glycol monohexadecylether, hexaethylene glycol monotetradecylether, hexaethylene glycol monooctadecylether, heptaethylene glycol monododecylether, heptaethylene glycol monohexadecylether, heptaethylene glycol monotetradecylether, heptaethylene glycol monooctadecylether, nonaethylene glycol monododecylether, octaethylene glycol monododecylether; polyethylene oxide esters such as but not limited to hexaethylene glycol monododecylester, hexaethylene glycol monohexadecylester, hexaethylene glycol monotetradecylester, hexaethylene glycol monooctadecylester, heptaethylene glycol monododecylester, heptaethylene glycol monohexadecylester, heptaethylene glycol monotetradecylester, heptaethylene glycol monooctadecylester, nonaethylene glycol monododecylester, octaethylene glycol monododecylester; polysorbate esters such as polyoxyethylene sorbitan mono fatty acid esters including but not limited to polyoxyethylene sorbitan mono palmitate, polyoxyethylene sorbitan mono oleate, polyoxyethylene sorbitan mono stearate, polyoxyethylene sorbitan difatty acid esters such as polyoxyethylene sorbitan dipalmitate, polyoxyethylene sorbitan dioleate, polyoxyethylene sorbitan distearate, polyoxyethylene sorbitan monopalmitate monooleate, polyoxyethylene sorbitan tri fatty acid esters such as but not limited to polyoxyethylene sorbitan tristearate; and mixtures thereof.

In alternate non-limiting embodiments, the treating material (i.e., non-coupling material) can have a molecular weight of less than 10000 grams/mole, or less than 5000, or less than 2000, or less than 1000, or greater than 100.

The amount of treating material (i.e., non-coupling material) used in the present invention can vary widely and can depend upon the particular treating material selected. In alternate non-limiting embodiments, the amount of treating material can be greater than 1% based on the weight of untreated filler, or from 1.1% to 25%, or from 1.2% to 20%, or from 2% to 15%.

In one non-limiting embodiment, the present invention is directed to a process for producing treated filler comprising: (a) treating a slurry of untreated filler wherein the untreated filler has not been previously dried, with a non-coupling material (i.e., treating material) as described above) and, optionally, a coupling material (as described below) to produce a treated filler slurry wherein the treating material is present in an amount of from greater than 1% to 25% by weight of the untreated filler; and (b) drying the treated filler slurry.

As used herein and the claims, the term "coupling material" means a material that can be covalently bonded to the polymeric composition in which the treated filler can be used. Non-limiting examples of coupling materials can include but are not limited to organosilanes of the general formula:

$(R_1)_a(R_2)_b SiX_{4-a-b}$ wherein $R_1$ each can be independently an organofunctional hydrocarbon radical comprising 1 to 12 carbon atoms, wherein the organofunctional group can be vinyl, allyl, hexenyl, epoxy, glycidoxy, (meth)acryloxy, sulfide, isocyanato, polysulfide or mercapto; each $R_2$ can be independently a hydrocarbon group having from 1 to 18 carbon atoms or hydrogen, X each can be independently halogen or alkoxy radical comprising 1 to 12 carbon atoms, a can be 0, 1, 2, or 3, b can be 0, 1, or 2, and a+b can be 1, 2, or 3, with the proviso that when b is 1 then a+b is 2 or 3. The $R_1$ and $R_2$ groups can be selected such that they can react with the polymeric composition in which the treated filler can be used. In alternate non-limiting embodiments, the coupling material can be a specific organosilane with a specific $R_1$, $R_2$, X, a and b or can be a mixture of organosilanes with the same or different $R_1$, $R_2$, X, a and b.

In alternate non-limiting embodiments, the coupling material can include bis(alkoxysilylalkyl)polysulfides represented by formula I

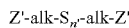   I in which alk can be a divalent hydrocarbon radical having from 1 to 18 carbon atoms; n' can be an integer from 2 to 12; and Z' can be:

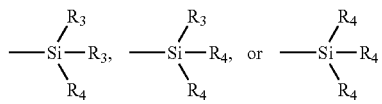

wherein $R_3$ can be an alkyl group having from 1 to 4 carbon atoms or phenyl, and $R_4$ can be an alkoxy group having from 1 to 8 carbon atoms, a cycloalkoxy group with from 5 to 8 carbon atoms, or a straight or branched chain alkylmercapto group with from 1 to 8 carbon atoms. In alternate non-limiting embodiments, the $R_3$ and $R_4$ groups can be the same or different. In further alternate non-limiting embodiments, the divalent alk group can be straight or branched chain, a saturated or unsaturated aliphatic hydrocarbon group or a cyclic hydrocarbon group.

Non-limiting examples of bis(alkoxysilylalkyl)-polysulfides can include bis(2-trialkoxysilylethyl)-polysulfides in which the trialkoxy group can be trimethoxy, triethoxy, tri (methylethoxy), tripropoxy, tributoxy, etc. up to trioctyloxy and the polysulfide can be either di-, tri-, tetra-, penta-, or hexasulfide, or mixtures thereof. Further non-limiting examples can include the corresponding bis(3-trialkoxysilylpropyl)-, bis(3-trialkoxysilylisobutyl), -bis(4-trialkoxysilylbutyl)-, etc. up to bis(6-trialkoxysilyl-hexyl)-polysulfides.

Further non-limiting examples of bis(alkoxysilylalkyl)-polysulfides are described in column 6, lines 5-55 of the aforesaid U.S. Pat. No. 3,873,489 and in column 11, lines 11-41 of U.S. Pat. No, 5,580,919. Further non-limiting examples of such compounds are: 3,3'bis(trimethoxysilylpropyl)disulfide, 3,3'-bis(triethoxysilylpropyl)tetrasulfide, 3,3'-bis(trimethoxysilylpropyl)tetrasulfide, 2,2'-bis(triethoxysilylethyl)tetrasulfide, 3,3'-bis(trimethoxysilylpropyl) trisulfide, 3,3'-bis(triethoxysilylpropyl)trisulfide, 3,3'-bis (tributoxysilylpropyl)disulfide, 3,3'-bis (trimethoxysilylpropyl)hexasulfide, and 3,3'-bis (trioctoxysilylpropyl)tetrasulfide and mixtures thereof.

In a further alternate non-limiting embodiment, the coupling material can be bis(alkoxysilylalkyl)polysulfide available under the trade name Si-69 from Degussa Corp., which is identified as a mixture of 3,3'-bis(triethoxysilylpropyl) monosulfide, 3,3'-bis(triethoxysilylpropyl)disulfide, 3,3'-bis (triethoxysilylpropyl)trisulfide, 3,3'-bis(triethoxysilylpropyl)tetrasulfide and higher sulfide homologues having an average sulfide of 3.5.

In further alternate non-limiting embodiments, the coupling material can be a mercaptoorganometallic compound represented by the following formula II:

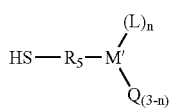   II wherein M' can be silicon, L can be halogen or —$OR_6$, Q can be hydrogen, $C_1$-$C_{12}$ alkyl, or halosubstituted $C_1$-$C_{12}$ alkyl, $R_5$ can be $C_1$-$C_{12}$ alkylene, $R_6$ can be $C_1$-$C_{12}$ alkyl or alkoxyalkyl containing from 2 to 12 carbon atoms, said halogen or (halo) groups being chloro, bromo, iodo or fluoro, and n can be 1, 2 or 3. In a non-limiting embodiment, mercaptoorganometallic reactants having two mercapto groups can be used.

Non-limiting examples of mercaptoorganometallic compound(s) can include but are not limited to mercaptomethyltrimethoxysilane, mercaptoethyltrimethoxysilane, mercaptopropyltrimethoxysilane, mercaptomethyltriethoxysilane, mercaptoethyltripropoxysilane, mercaptopropyltriethoxysilane, (mercaptomethyl)dimethylethoxysilane, (mercaptomethyl)methyldiethoxysilane, 3-mercaptopropyl-methyldimethoxysilane, and mixtures thereof.

In further alternate non-limiting embodiments, the coupling material can be a mercaptoorganometallic compound such as mercaptopropyltrimethoxysilane or mercaptomethyltriethoxysilane or mixtures thereof.

In a further alternate non-limiting embodiment, the coupling material can be a mercaptoorganometallic compound in which the mercapto group is blocked, i.e., the mercapto hydrogen atom is replaced by another group. Blocked mercaptoorganometallic compounds can have an unsaturated heteroatom or carbon bound directly to sulfur via a single bond. Non-limiting examples of specific blocking groups can include thiocarboxylate ester, dithiocarbamate ester, thiosulfonate ester, thiosulfate ester, thiophosphate ester, thiophosphonate ester, thiophosphinate ester, etc. In a non-limiting embodiment wherein a blocked mercaptoorganometallic compound is used as the coupling material, a deblocking agent can be added to the polymeric compound mixture to deblock the blocked mercaptoorganometallic compound. In a non-limiting embodiment wherein water and/or alcohol are present in the mixture, a catalyst, e.g., tertiary amines, Lewis acids or thiols, can be used to initiate and promote the loss of the blocking group by hydrolysis or alcoholysis to liberate the corresponding mercaptoorganometallic compounds. Non-limiting examples of blocked mercaptosilanes can include but are not limited to 2-triethoxysilyl-1-ethyl thioacetate, 3-trimethoxy-silyl-1-propyl thiooctoate, bis-(3-triethoxysilyl-1-propyl)-methyldithiophosphonate, 3-triethoxysilyl-1-propyldimethylthiophosphinate, 3-triethoxysilyl-1-propylmethylthiosulfate, 3-triethoxysilyl-1-propyltoluenethiosulfonate, and mixtures thereof.

The amount of coupling material used in the present invention can vary widely and can depend upon the particular coupling material selected. The amount of coupling material can be greater than 0.1% based on the weight of untreated filler. In further alternate non-limiting embodiments, the amount can be from 0.5% to 25% based on the weight of untreated filler, or from 1% to 20%, or from 2% to 15%.

In the present invention, untreated filler can be treated at various stages throughout the preparation process. In a non-limiting embodiment of the present invention, treatment of untreated filler slurry with a treating material (i.e., non-coupling material) cannot occur prior to initial formation of the untreated filler. In another non-limiting embodiment, treatment of the untreated filler slurry with treating material (i.e., non-coupling material) can occur essentially immediately following initial formation of the untreated filler. In still another non-limiting embodiment, treatment of the untreated filler slurry with treating material (i.e., non-coupling material) can occur at any time following initial formation of untreated filler and prior to drying. In general, initial formation of filler can be observed and/or determined by various conventional methods known in the art. In another non-limiting embodiment, initial formation of filler can occur essentially immediately upon addition of acid to alkali metal silicate solution. In another non-limiting embodiment, initial formation of filler can occur when particle(s) of 5 nm or greater are present. In still another non-limiting embodiment, initial formation of filler can be determined by measuring particle size using known light scattering techniques. In a further non-limiting embodiment, laser light scattering can be used to determine the initial formation of filler by the presence of particle(s) having diameter(s) greater than 40 nm.

In a non-limiting embodiment of the present invention, treatment of the untreated filler slurry with a treating material (i.e., non-coupling material) can occur prior to drying the filler slurry. Also, prior to drying, the untreated filler slurry can be treated with at least one non-coupling material and at least one coupling material to produce the treated filler. Alternatively, the treatment with the non-coupling material does not occur prior to initial formation of the untreated filler.

In another non-limiting embodiment, treatment of the untreated filler slurry or filler slurry with non-coupling material can occur essentially immediately following initial formation of untreated filler or immediately following formation of filler treated with coupling material and prior to drying.

In still another non-limiting embodiment, treatment of the untreated filler slurry or filler slurry formed with treatment material (i.e. non-coupling material) with coupling material can occur at any time following initial formation of untreated filler or essentially immediately following formation of filler treated with non-coupling material and prior to drying.

In another non-limiting embodiment, treatment of the untreated filler slurry with non-coupling material and coupling material can occur simultaneously, essentially immediately following initial formation of untreated filler or any time thereafter and prior to drying. In alternate non-limiting embodiments, treating material (i.e., non-coupling material) can be added essentially simultaneously with acid or immediately following acid addition to the alkali metal silicate solution. In further alternate non-limiting embodiments, treating material (i.e., non-coupling material) may not be present in the alkali metal silicate solution prior to initial formation of untreated filler or the initial addition of acid. In still another non-limiting embodiment, treatment of untreated filler slurry with a treating material (i.e., non-coupling material) can result from a time such that templated mesoporous structures are not present. Templated mesoporous structures can result from a process whereby a network is formed around a template molecule in such a way that the removal of the template molecule creates a mesoporous structure with morphological and/or stereochemical features related to those of the template molecule. Such process is described in "Template Based Approaches to the Preparation of Amorphous, Nanoporous Silicas", Chemistry of Materials, (August 1996) Vol. 8, No. 8, pg. 1682, which is incorporated herein by reference.

In a non-limiting embodiment of the present invention, treatment of untreated filler slurry or coupling filler slurry with the non-coupling material can occur prior to drying.

In a non-limiting embodiment of the present invention, treatment of the untreated filler slurry or non-coupling filler slurry with the coupling material can occur prior to drying.

In another non-limiting embodiment, non-coupling and, optionally, coupling materials can be added simultaneously with acid addition or immediately following acid addition.

In a further non-limiting embodiment, non-coupling material may not be present in the alkali metal silicate solution prior to initial formation of untreated filler or the initial addition of acid. In still another non-limiting embodiment, treatment of the untreated filler slurry with a non-coupling and, optionally, a coupling material can occur at a time such that templated mesoporous structures essentially are not present. Templated mesoporous structures can result from a process wherein a network is formed around a template molecule in such a way that the removal of the template molecule can create a mesoporous structure with morphological and/or stereochemical features related to those of the template molecule.

In alternate non-limiting embodiments, treatment of the untreated filler slurry with non-coupling material can be at the same stage as the coupling material or at any stage before or after treatment with the coupling material provided that non-coupling material is not present prior to initial formation of untreated filler.

In a non-limiting embodiment, the treated filler of the present invention can be prepared in accordance with the following process.

Silica slurry can be prepared by combining alkali metal silicate with acid. A solid form of alkali metal silicate can be dissolved in water to produce an "additive" solution. In another non-limiting embodiment, the "additive" solution can be prepared by diluting a concentrated solution of an aqueous alkali metal silicate to a desired concentration of alkali metal. Herein, the weight amount of alkali metal is reported as "$M_2O$". In alternate non-limiting embodiments, the "additive" solution can contain from 1 to 50 weight percent $SiO_2$, or from 10 to 25 weight percent, or from 15 to 20 weight percent. In further alternate non-limiting embodiments, the "additive" solution can have a $SiO_2:M_2O$ molar ratio of from 0.1:1 to 4:1, or from 2.9:1 to 3.5:1, or from 3.1:1 to 3.4:1.

A portion of the "additive" aqueous alkali metal silicate solution can be diluted with water to prepare an "initial" aqueous alkali metal silicate solution. In alternate non-limiting embodiments, this "initial" solution can contain from 0.1 to 20 weight percent $SiO_2$, or from 0.2 to 15 weight percent, or from 0.3 to 10 weight percent. In further alternate non-limiting embodiments, this "initial" solution can have a $SiO_2:M_2O$ molar ratio of from 0.1:1 to 4:1, or from 1.6:1 to 3.9:1, or from 2.9:1 to 3.5:1, or from 3.1:1 to 3.4:1

In a non-limiting embodiment, this "initial" silicate solution can contain an alkali metal salt of a strong acid. Non-limiting examples of suitable salts can include but are not limited to sodium chloride, sodium sulphate, potassium sulphate or potassium chloride, and other like essentially neutral salts. In a non-limiting embodiment, the amount of salt added can be from 5 to 80 grams per liter. In another non-limiting embodiment, wherein the rate of addition of acid can be greater than 30 minutes, the amount of alkali metal salt can be in the range of 5 to 50 grams per liter.

Acid can be added with agitation to the "initial" aqueous alkali metal silicate solution to neutralize the $M_2O$ present to form a first silica slurry. In alternate non-limiting embodiments, at least 10 percent of the $M_2O$ present in the "initial" aqueous alkali metal silicate solution can be neutralized, or from 20 to 50 percent, or as much as 100 percent. The percent neutralization can be calculated using conventional techniques known in the art. In a non-limiting embodiment, the percent neutralization can be calculated by assuming that one (1) equivalent of strong acid neutralizes one (1) equivalent of $M_2O$. For example, 1 mole (2 equivalents) of sulfuric acid can neutralize 1 mole (2 equivalents) of $M_2O$. Further, the pH of the reaction mixture can vary. In alternate non-limiting embodiments, the pH can be adjusted to less than 9.5, or greater than 2.6, or less than 9.0, or 8.5 or less. The pH can be measured using various conventional techniques known to a skilled artisan. The pH values recorded herein and the claims are measured in accordance with the procedure described in the Examples section herein.

In general, both the time period during which the acid is added to the solution and the temperature of the reaction mixture during acid addition can vary widely. In alternate non-limiting embodiments, the acid can be added over a time period of at least ten (10) minutes, or less than six hours, or from 0.5 hours to 5 hours, or from 2 hours to 4 hours. In alternate non-limiting embodiments, the temperature of the reaction mixture during the acid addition may range from at least 20° C., to less than 100° C., or from 30° C. to 100° C., or from 40° C. to 88° C.

Suitable acids for neutralization can vary widely. The selection of acid can depend on both the rate at which the acid is added to the solution and the temperature of the solution during acid addition. In general, suitable acids can include any acid or acidic material that can be substantially water-soluble and can react with alkali metal silicate to neutralize the alkali thereof. Non-limiting examples can include but are not limited to mineral acids and their acidic salts, such as hydrochloric acid, sulfuric acid, phosphoric acid, sulfurous acid, nitric acid, formic acid, acetic acid, and mixtures thereof. In a non-limiting embodiment, sulfuric acid can be used.

In a non-limiting embodiment, weak gaseous acid can be used to neutralize the alkali metal silicate solution. Non-limiting examples of such gaseous acids can include but are not limited to carbon dioxide, sulfur dioxide, hydrogen sulfide, chlorine and mixtures thereof. In a non-limiting embodiment, carbon dioxide can be used.

In a non-limiting embodiment, the first silica slurry can be allowed to decant for a period of time. The amount of time can vary widely. In alternate non-limiting embodiments, the time period can be from 0.5 to 50 hours, or from 5 to 36 hours, or from 12 to 24 hours. In a non-limiting embodiment, the first silica slurry can be washed during decantation to remove salts in the first silica slurry.

In a non-limiting embodiment, treating material (i.e., non-coupling material) and, optionally, coupling material can be added to the first silica slurry. In alternate non-limiting embodiments, treating material (i.e., non-coupling material) and, optionally, coupling material can be added prior to decantation, during decantation or following decantation to produce treated silica slurry.

In a further non-limiting embodiment, the washing can be accomplished by diluting the first silica slurry with water to form a second silica slurry. In general, the amount of water used can vary widely. In alternate non-limiting embodiments, the amount of water added can be sufficient to reduce the concentration of silica in the solution such that the second silica slurry can contain less than 15 weight percent $SiO_2$, or less than 10 weight percent, or from 0.5 to 8 weight percent, or from 1 to 7 weight percent. In further alternate non-limiting embodiments, the amount of water added can be sufficient to reduce the concentration of salt in the solution such that the second silica slurry can contain less than 10 weight percent of salt, or less than 5 weight percent, or from 0.1 to 3 weight percent, or from 0.3 to 1 weight percent.

In a non-limiting embodiment, flocculant can be added to the second silica slurry. Suitable flocculants for use in the present invention can be selected from a wide variety of materials known in the art. In a non-limiting example, the flocculant can be cationic flocculant such as but not limited to polydimethyldiallylammonium chloride. The amount of flocculants added can vary widely. In alternate non-limiting embodiments, the flocculant can be present in amount of from 0.005 to 0.5% by weight of the silica in the second silica slurry, or from 0.05 to 0.25% by weight, or from 0.1 to 0.2% by weight.

In further non-limiting embodiments, the dilution step can be repeated at least one subsequent time.

The temperature of the second silica slurry can vary. In alternate non-limiting embodiments, it can be at least 25° C., or from 45° C. to 97° C.

In a non-limiting embodiment, treating material (i.e., non-coupling material) and, optionally, coupling material can be added to the second silica slurry to produce treated silica slurry. In further alternate non-limiting embodiments, treating material (i.e., non-coupling material) and, optionally, coupling material can be added prior to adding flocculant, essentially simultaneously with the addition of flocculant, or following addition of flocculant.

In a non-limiting embodiment, another portion of the "additive" aqueous alkali metal silicate solution and acid can be added to the second silica slurry over a period of time to form a third silica slurry. In a non-limiting embodiment, the "additive" solution and acid are added simultaneously to the second silica slurry. In alternate non-limiting embodiments, the addition can be completed in a period of from 5 to 400 minutes, or from 30 to 360 minutes, or from 45 to 240 minutes. The amount of "additive" solution used can vary. In alternate non-limiting embodiments, the amount of "additive" solution can be such that the amount of $SiO_2$ added can be from 0.1 to 50 times the amount of $SiO_2$ present in the "initial" aqueous alkali metal silicate solution, or from 0.5 to 30 times. Suitable acids for use in this neutralization step can vary widely. As aforementioned, the acid can be strong enough to neutralize the alkali metal silicate. Non-limiting examples of such acids can include those previously disclosed herein. Further, the amount of acid or acidic material used can vary.

In alternate non-limiting embodiments, the amount of acid added can be such that at least 20 percent of the $M_2O$ contained in the "additive" solution added during the addition can be neutralized, or at least 50 percent, or 100 percent of the $M_2O$.

In alternate non-limiting embodiments, the pH can be maintained at less than 10, or less than 9.5, or 9.0 or less than 8.5.

In a non-limiting embodiment, the third silica slurry can be allowed to decant for a period of time. In a further non-limiting embodiment, water can be added to dilute the third slurry. The decanting and diluting steps as previously described herein for the second silica slurry are applicable to the third silica slurry.

In a non-limiting embodiment treating material (i.e., non-coupling material) and, optionally, coupling material can be added to the third silica slurry to produce treated silica slurry. In further non-limiting embodiments, treating material can be added prior to, during or following decantation.

In alternate non-limiting embodiments of the present invention, the first, second, third or subsequent silica slurry can be treated with treating material (i.e., non-coupling material) and, optionally, coupling material chosen from those previously recited herein, in an amount chosen from the ranges previously disclosed herein. In further alternate non-limiting embodiments, the treating material (i.e., non-coupling material) and, optionally, coupling material can be added during or after subsequent filtering, or washing steps of the first, second, third or subsequent silica slurry produced in the foregoing process description.

Following treatment with non-coupling material and, optionally, coupling material, acid then can be added to the treated silica slurry with agitation to adjust the pH of the treated silica slurry. In alternate non-limiting embodiments, the amount of acid added can be such that the pH can be less than 7.0 or greater than 2.6, or from 3.0 to 6.0, or from 4 to 5. Acids suitable for use in this step can vary widely. As stated previously, the acid generally can be strong enough to reduce the pH of the mixture to within the above-disclosed ranges Non-limiting examples of such acids can include those previously disclosed herein.

In another non-limiting embodiment, the treated filler of the present invention can be prepared in accordance with the following process. An "additive" solution and an "initial" solution can be prepared as described in the process above. Further, acid can be added to the "initial" aqueous alkali metal silicate solution as described above to at least partially neutralize the $M_2O$ present to form a first silica slurry. The "initial" solution, with or without the addition of acid, is referred to as the "precipitation heel". In a non-limiting embodiment, the precipitation heel contains no alkali metal silicate. The temperature of the precipitation heel can vary. In alternate non-limiting embodiments, the temperature can be from 20° to boiling point of the slurry, or from 25° to 100° C., or from 30° to 98 ° C.

Following formation of the "precipitation heel", a simultaneous addition step can begin wherein aqueous metal silicate and acid can be added essentially simultaneously to the "precipitation heel". The resultant slurry is referred to as the "simultaneous addition slurry". The time to complete the simultaneous addition step can vary with the amount of reactants added. In alternate non-limiting embodiments, the time period can be from 10-360 minutes, or from 20-240 minutes, or from 30-180 minutes. The aqueous metal silicate can be chosen from a wide variety of silicates. In a non-limiting embodiment, the silicate used in the simultaneous addition step can be the same as the initial silicate. In alternate non-limiting embodiments, the amount of metal silicate added during the simultaneous addition step can be from 1 to 100 times the amount added during the precipitation heel formation step, or from 2 to 50 times, or from 3 to 30 times.

In another non-limiting embodiment, wherein no aqueous alkali metal silicate solution is present in the precipitation heel, the amount of metal silicate added during the simultaneous addition step can be such that a target silica concentration is reached at the end of the simultaneous addition step. In alternate non-limiting embodiments, the target silica concentration can be from 1 to 150 g/l, or from 10 to 120 g/l, or from 50 to 100 g/l.

In alternate non-limiting embodiments, during the simultaneous addition step, acid can be added in an amount such that a desired concentration of unreacted metal oxide is maintained, or a desired pH level is maintained, or a desired change in metal oxide concentration or pH level vs. time is maintained throughout the simultaneous addition step. In a further non-limiting embodiment, acid can be added during the simultaneous addition step at a rate such that the amount of unreacted metal oxide concentration calculated in the "simultaneous addition slurry" is essentially the same as the amount of unreacted metal oxide concentration measured in the "precipitation heel". In further alternate non-limiting embodiments, the pH target for the "simultaneous addition slurry" can be at least 6, or not greater than 12, or from 7 to 10. In a non-limiting embodiment, during the simultaneous addition step, the metal silicate flow and acid flow can be initiated at substantially the same time. In alternate non-limiting embodiments, one of the acid flow or the metal silicate flow can begin first to achieve a target pH prior to adding both acid and metal silicate substantially simultaneously. The pH can be measured using various conventional techniques known to a skilled artisan. The pH values recorded herein and the claims are measured in accordance with the procedure described in the Examples section herein.

The temperature of the simultaneous addition step can vary within ranges previously identified herein for the precipitation heel formation step. In a non-limiting embodiment, the temperature can be essentially the same as for the precipitation heel formation step. In another non-limiting embodiment, the target temperature can be different from the precipitation heel formation step.

In a non-limiting embodiment, treating material can be added to the silica slurry during the simultaneous addition step to produce treated silica slurry.

In a non-limiting embodiment, the reactant flows can be stopped and the simultaneous addition slurry allowed to age. The age step can be implemented at any time during the simultaneous addition step. The temperature and time of the age step can vary widely. In alternate non-limiting embodiments, the time period can be from 1 minute to 24 hours, or from 3 hours to 8 hours, or from 10 minutes to 1 hour. In alternate non-limiting embodiments, the temperature of the simultaneous addition slurry can be from 20° to the boiling point of the slurry, or from 40° to 100° C.

In a non-limiting embodiment, essentially all of the aqueous metal silicate can be added during the precipitation heel formation step and acid only can be added during the simultaneous addition step. In this embodiment, an essentially constant unreacted metal oxide concentration or pH may not be maintained during the simultaneous addition step.

The simultaneous addition step can be repeated subsequent times as desired. The resulting slurries can be called "second simultaneous addition slurry", "third simultaneous addition slurry", etc. In alternate non-limiting embodiments, the amounts of aqueous metal silicate and acid can be different from the initial simultaneous addition and can range from 0.1 to 100% of the material used in the first simultaneous addition.

In alternate non-limiting embodiments, treating material can be added during the second simultaneous addition slurry, or the third simultaneous addition slurry, or subsequent simultaneous addition slurry to produce treated silica slurry.

In an alternate non-limiting embodiment, following completion of the simultaneous addition step(s), a "post simultaneous addition age step" can be conducted.

In a non-limiting embodiment with post simultaneous addition aging, all reactant flows can be essentially stopped and the silica slurry, called "age slurry", can be allowed to set and age. In alternate non-limiting embodiments, with post simultaneous addition aging, the acid and/or metal silicate can be allowed to continue to flow into the age slurry until a target age pH is achieved; all reactant flows then can be essentially stopped and the age slurry can be allowed to age, optionally under agitation for a period of time. The pH of the post simultaneous addition age step can vary widely. In alternate non-limiting embodiments, the pH of the post simultaneous age step can be essentially the same as the pH at the end of the simultaneous addition step, or the pH can be at least 6, or not greater than 10, or from 8 to 9. In alternate non-limiting embodiments, the age time can be from 5 minutes to several days, or from 15 minutes to 10 hours, or from 30 to 180 minutes. The age temperature can vary widely. In alternate non-limiting embodiments, the age temperature can be essentially the same as the temperature at the end of the simultaneous addition step, or the temperature can be higher than the temperature of the simultaneous addition step, or the temperature can be as high as the boiling point of the age slurry.

In a non-limiting embodiment, the age slurry can be treated with treating material to produce treated silica slurry.

At the end of the post simultaneous age step, or at the end of the simultaneous addition step where no post simultaneous addition age step was conducted, a final slurry pH adjustment step can take place. The slurry is referred to as the "pH adjustment slurry". In a non-limiting embodiment, the temperature for the final pH adjustment can be essentially the same as the temperature at the end of the previous step; i.e., the simultaneous addition step or the post simultaneous addition age step. In another non-limiting embodiment, the temperature can be adjusted to a target temperature which can vary. In alternate non-limiting embodiments, the temperature can be from 40° C. to boiling point, or from 60° C. to 100° C. In alternate non-limiting embodiments, the final pH adjustment can include adding acid, metal silicate or base to the pH adjustment slurry in an amount such that a target pH is reached. When the target pH value is reached, the slurry is referred to as the "final pH adjusted slurry". The pH target for the final pH adjusted slurry can vary widely. In alternate non-limiting embodiments, the pH target can be essentially the same as the post simultaneous aging pH, or at least 2, or not greater than 9, or from 3 to 7, or from 4 to 6.

Suitable acids for neutralization in the above-described steps can vary widely. The selection of acid can depend on the rate at which the acid is added to the solution and the temperature of the solution during acid addition. Suitable acids can include any acid or acidic material that can be essentially water soluble and can react with alkali metal silicate to neutralize the alkali thereof. Non-limiting examples can include but are not limited to mineral acids and their acidic salts, such as hydrochloric acid, sulfuric acid, phosphoric acid, sulfurous acid, nitric acid, formic acid, acetic acid. In a non-limiting embodiment, sulfuric acid can be used.

In a non-limiting embodiment, the pH adjustment slurry can be treated with treating material (i.e., non-coupling material) and, optionally, coupling material to produce treated silica slurry.

In another non-limiting embodiment, flocculant can be added to the post simultaneous addition age slurry. Suitable flocculants and the amount added can be selected from those previously described herein.

In alternate non-limiting embodiments of the present invention, silica slurry from the simultaneous addition step, the post simultaneous age step, the pH adjustment step or the final pH adjusted slurry step can be treated with treating material (i.e., non-coupling material) and, optionally, coupling material chosen from those previously recited herein, in an amount chosen from the ranges previously disclosed herein. In further alternate non-limiting embodiments, the treating material (i.e., non-coupling material) and, optionally, coupling material can be added during or after subsequent filtering, or washing steps of the silica slurry from the simultaneous addition step, the post simultaneous age step, the pH adjustment step and the final pH adjusted slurry step.

In general, for the filler preparation methods described above, the degree of agitation used in the various steps can vary considerably. The agitation employed during the addition of one or more reactants should be at least sufficient to provide a thorough dispersion of the reactants and reaction mixture so as to minimize or essentially preclude more than trivial locally high concentrations of reactants and to ensure that silica deposition occurs substantially uniformly.

For the silica preparation methods described above, the silica slurry can be separated using conventional techniques to substantially separate solids from at least a portion of the liquid. Non-limiting examples of separation techniques can include but are not limited to filtration, centrifugation, decantation, and the like.

In a non-limiting embodiment, following separation, the silica slurry can be washed using a variety of known procedures for washing solids. In a further non-limiting embodiment, water can be passed through a filtercake of treated or untreated silica slurry. In alternate non-limiting embodiments, one or more washing cycles can be employed as desired. A purpose of washing the silica slurry can be to remove salt formed by the neutralization step(s) to desirably low levels. The separation and wash steps can be conducted a number of successive times until the salt is substantially removed. In alternate non-limiting embodiments, the treated or untreated silica slurry can be washed such that the concentration of salt in the dried treated filler is less than or equal to 2 weight percent, or less than or equal to 1 weight percent.

In general, silica slurry can be dried using one or more techniques known to a skilled artisan. Non-limiting examples can include but are not limited to drying the silica slurry in an air oven, vacuum oven, rotary dryer, or spray drying in a column of hot air, or spin flash dryer. Examples of spray dryers can include rotary atomizers and nozzle spray dryers. The temperature at which drying is accomplished can vary widely. In a non-limiting embodiment, the drying temperature can be below the fusion temperature of the treated filler. In further alternate non-limiting embodiments, the drying temperature can be less than 700° C. or greater than 100° C., or from 200° C. to 500° C., or from 100° C. to 350° C. In alternate non-limiting embodiments, the drying process can continue until the treated filler has properties characteristic of a powder or a pellet.

In a non-limiting embodiment of the present invention, untreated filler slurry can be treated with treating material prior to initiating the foregoing drying process.

Following drying, the treated filler can contain water of hydration. The amount of water present in the treated filler can vary. In alternate non-limiting embodiments, the water can be present in an amount of from 0.5% to 20% by weight of the treated filler. At least a portion of this water can be free water. As used herein and the claims, "free water" means that water which can be at least partially driven-off by drying at a temperature from 100° C. to 200° C. In a non-limiting embodiment, free water can constitute from 1% to 10% by weight of the water present in the treated filler. In another non-limiting embodiment, free water can be at least partially driven-off by heating the treated filler for at least 24 hours at a temperature of at least 105° C. As used herein and the claims, any water remaining in the treated filler after such drying process(es), can be referred to as "bound water". In a non-limiting embodiment, bound water can be at least partially removed by additional heating the treated filler at calcination temperatures, such as for example, from 1000 to 1200° C. In alternate non-limiting embodiments, bound water can constitute from 2 to 10% by weight, or from 6 to 8% by weight of treated filler.

In a non-limiting embodiment, the treated filler of the present invention can be subjected to conventional size reduction techniques. Such techniques are known in the art and may be exemplified by grinding and pulverizing. In a further non-limiting embodiment, fluid energy milling using air or superheated steam as the working fluid can be employed. Fluid energy mills are known in the art. In a non-limiting embodiment, in fluid energy mills the solid particles can be suspended in a gas stream and conveyed at high velocity in a circular or elliptical path. Some reduction occurs when the particles strike or rub against the walls of the confining chamber, but a significant portion of the reduction is believed to be caused by interparticle attrition.

In another non-limiting embodiment, the treated filler of the present invention can be modified with one or more materials that coat, partially coat, impregnate, and/or partially impregnate the filler. A wide variety of known materials can be used for this purpose. In general, the type of material used depends upon the effect desired. Non-limiting examples of such materials suitable for use can include but are not limited to organic polymers, such as but not limited to hydrocarbon oils, polyesters, polyamides, polyolefins, phenolic resins, aminoplast resins, polysiloxanes, polysilanes, and mixtures thereof. The modification step can be accomplished at essentially any time during or after formation of the treated filler.

The treated filler of the present invention can have a BET surface area that can vary widely. In alternate non-limiting embodiments, the BET surface area can be from 25 to 1000 $m^2/g$, or from 75 to 250 $m^2/g$. Further, the treated filler of the present invention can have a CTAB specific surface area that varies widely. In alternate non-limiting embodiments, the CTAB specific surface area can be from 5 to 750 $m^2/g$, or from 25 to 500 $m^2/g$, or from 75 to 250 $m^2/g$. CTAB is a measure of the external surface area of the treated filler and can be determined using a variety of conventional methods known in the art. The CTAB values recited herein and the claims are measured in accordance with the French Standard Method (French Standard NFT 45-007, Primary Materials for the Rubber Industry: Precipitated Hydrated Silica, Section 5.12, Method A, pp. 64-71, November 1987) which measures the external specific surface area by determining the quantity of CTAB (CetylTrimethylAmmonium Bromide) before and after adsorption at a pH of from 9.0 to 9.5, using a solution of the anionic surfactant Aerosol OT® as the titrant. Unlike other known CTAB methods which use filtration to separate filler, the French Standard Method uses centrifugation. The quantity of CTAB adsorbed for a given weight of treated filler and the space occupied by the CTAB molecule are used to calculate the external specific surface area of the treated filler. The external specific surface area value is expressed in square meters per gram. The detailed procedure used to determine CTAB values recited herein and the claims is set forth in the Examples.

In a non-limiting embodiment of the present invention, the treated filler can have a lower BET surface area than a comparable filler without treatment. In another non-limiting embodiment, the treated filler of the present invention can have a BET surface area value lower than its CTAB surface area.

The treated filler of the present invention can be used in a variety of applications such as in battery separators. Also, the treated filler of the present invention can be included in a wide variety of organic polymeric compositions, such as but not limited to plastics, thermoplastic and thermosetting resins, elastomers and rubbers. Non-limiting examples of such polymeric compositions are described in *Kirk Othmer Encyclopedia of Chemical Technology*, Fourth Edition, 1996, Volume 19, pp 881-904, which description is herein incorporated by reference. In alternate non-limiting embodiments, the treated filler can be admixed with the polymer or the polymerizable components thereof while the physical form of the polymer or pblymerizable components can be in compoundable solid form or liquid such as a solution, suspension, latex, dispersion, and the like. The polymeric compositions containing the treated filler can be milled, mixed, molded and optionally cured, by a manner known in the art, to form a polymeric article. In alternate non-limiting embodiments, the polymeric article can have dispersed therein 10 to 150 parts per 100 parts polymer of treated filler.

The present invention is more particularly described in the following examples, which are intended to be illustrative only, since numerous modifications and variations therein will be apparent to those skilled in the art. Unless otherwise specified, all parts and all percentages are by weight.

EXAMPLES

The following surface area method uses CTAB solution for analyzing the external specific surface area of treated filler according to this invention. The analysis was performed using a Metrohm 751 Titrino automatic titrator, equipped with a Metrohm Interchangeable "Snap-In" 50 milliliter buret and a Brinkmann Probe Colorimeter Model PC 910 equipped with a 550 nm filter. In addition, a Mettler Toledo HB43 or equivalent was used to determine the moisture loss of the filler and a Fisher Scientific Centrific™ Centrifuge Model 225 for separation of the filler and the residual CTAB solution. The excess CTAB was determined by auto titration with a solution of Aerosol OT® until maximum turbidity was attained which is detected with the probe colorimeter. The maximum turbidity point was taken as corresponding to a millivolt reading of 150. Knowing the quantity of CTAB adsorbed for a given weight of filler and the space occupied by the CTAB molecule, the external specific surface area of the treated filler is calculated and reported as square meters per gram on a dry-weight basis.

Solutions required for testing and preparation included a buffer of pH 9.6, hexadecyl-trimethylammonium bromide (CTAB), dioctyl sodium sulfosuccinate (Aerosol OT) and 1N sodium hydroxide. The buffer solution of pH 9.6 was prepared by dissolving 3.101 g of orthoboric acid (99%; Fisher Scientific, Inc., technical grade, crystalline) in a one-liter volumetric flask, containing 500 milliliter of deionized water and 3.708 g of potassium chloride solids (Fisher Scientific, Inc., technical grade, crystalline). Using a buret, 36.85 milliliter of the 1N sodium hydroxide solution was added. The solution was mixed and diluted to volume. The CTAB solution was prepared using 11.0 g±0.005 g of the powdered CTAB (cetyltrimethylammonium bromide, also known as hexadecyl-trimethylammonium bromide, Fisher Scientific Inc., technical grade) onto a weighing dish. The CTAB powder was transferred to a 2-liter beaker, rinsing the weighing dish with deionized water. Approximately 700 milliliter of the pH 9.6 buffer solution and 1000 milliliter of distilled or deionized water was added into the 2-liter beaker and stirred with a magnetic stir bar. A large watch glass was placed on the beaker and the beaker was stirred at room temperature until the CTAB was totally dissolved. The solution was transferred to a 2-liter volumetric flask rinsing the beaker and stir bar with deionized water. The bubbles were allowed to dissipate, and diluted to volume with deionized water. A large stir bar was added and mixed on a magnetic stirrer for approximately 10 hours. The CTAB solution can be used after 24 hours and for only 15 days. The Aerosol OT® (dioctyl sodium sulfosuccinate, Fisher Scientific Inc., 100% solid) solution was prepared using 3.46 g±0.005 g onto a weighing dish. The Aerosol OT was rinsed into a 2-liter beaker which contained about 1500 milliliter deionized water and a large stir bar. The Aerosol OT solution was dissolved and rinsed into a 2-liter volumetric flask. The solution was diluted to 2-liter volume mark in the volumetric flask. The Aerosol OT® solution was allowed to age for a minimum of 12 days prior to use. The Aerosol OT expires 2 months from preparation date.

Prior to surface area sample preparation, the pH of the CTAB solution was verified and adjusted to a pH of 9.6±0.1 using 1N sodium hydroxide solution. For test calculations a blank sample was prepared and analyzed. 5 milliliters CTAB solution was pipetted and 55 milliliters deionized water was added into a 150-milliliter beaker and analyzed on a Metrohm 751 Titrino automatic titrator. The automatic titrator was programmed for determination of the blank and the samples with following parameters: Measuring point density=2, Signal drift=20, Equilibrium time=20 seconds, Start volume=0 ml, Stop volume=35 ml, and Fixed endpoint=150 mV. The buret tip and the colorimeter probe were placed just below the surface of the solution, positioned such that the tip and the photo probe path length were completely submerged. Both the tip and photo probe were essentially equidistant from the bottom of the beaker and not touching one another. With minimum stirring (setting of 1 on the Metrohm 728 stirrer) the colorimeter was set to 100% T prior to every blank and sample determination and titration was initiated with the Aerosol OT® solution. The end point was recorded as the volume (ml) of titrant at 150 mV.

For test sample preparation, approximately 0.30 grams of powdered filler was weighed into a 50-milliliter container with a stir bar. Granulated filler samples, were riffled (prior to grinding and weighing) to obtain a representative subsample. A coffee mill style grinder was used to grind granulated materials. Then 30 milliliters of the pH adjusted CTAB solution was pipetted into the sample container with the 0.30 grams of powdered filler. The filler and CTAB solution was then mixed on a stirrer for 35 minutes. When mixing was completed, the filler and CTAB solution was centrifuged for 20 minutes to separate the filler and excess CTAB solution. When centrifuging was completed, the CTAB solution was pipetted into a clean container minus the separated solids, referred to as the "centrifugate". For sample analysis, 50 milliliters of deionized water was placed into a 150-milliliter beaker with a stir bar. Then 10 milliliters of the sample centrifugate was pipetted for analysis into the same beaker. The sample was analyzed using the same technique and programmed procedure as used for the blank solution.

For determination of the moisture content, approximately 0.2 grams of silica was weighed onto the Mettler Toledo HB43 while determining the CTAB value. The moisture analyzer was programmed to 105° C. with the shut-off 5 drying criteria. The moisture loss was recorded to the nearest ±0.1%.

The external surface area was calculated using the following equation, $$\text{CTAB Surface Area (dried basis) } [m^2/g] = \frac{(2V_o - V) \times (4774)}{(V_o W) \times (100 - Vol)}$$

wherein, $V_o$=Volume in ml of Aerosol OT® used in the Blank titration.

V=Volume in ml of Aerosol OT® used in the sample titration.

W=sample weight in grams.

Vol=% moisture loss (Vol represents "volatiles").

In the following Examples, the Apparent Tamped Density (ATD) was measured in accordance with the Apparent Tamped Density Test Method in ISO 787/11, "General Method of Tests for Pigments and Extenders—Part 11: Determination of Tamped Volume and Apparent Density After Tamping", First Edition, 1981-10-1, with the following exceptions: (1) the sample was not dried prior to measuring ATD; (2) the sample was not sieved prior to measuring ATD; (3) the sample was not tested in duplicate; and (4) sample size was 200±50 milliliters. In ISO 787/11, the recommended procedure for collecting a representative sample referred to ISO 842 which has been withdrawn and replaced by ISO 15528. The procedure of ISO 15528 was followed for samples of non-uniform size and/or color except that a 2 compartment stationary riffle divider was used until the appropriate distribution and sample size were achieved.

In the Examples, BET surface area was measured in accordance with ASTM D 1993-91.

The pH of the filler slurry was measured using an Oakton pH 100 Series meter or an Orion Ross Combination pH Electrode with BNC connector manufactured by Thermo Electron Corporation and purchased from Fisher Scientific. The electrode in preparation for analysis has the electrode-fill hole open, and to maintain an adequate flow rate, Ross pH Electrode Fill solution (Orion product number 8100073) molar potassium chloride (KCl) solution was added to cover the end of the coil. The pH meter was prepared for analysis by recalibrating the meter with pH Buffers 4, 7 and 10 that are traceable to NIST or an equivalent agency. Prior to the reaction pH measurement, the temperature of the reaction was manually entered the into the Oakton pH meter. The electrode was rinsed with deionized water and immersed into the reaction mixture allowing 2 to 3 minutes for the electrode to come to equilibrium. The displayed pH value was recorded. The electrode was removed and rinsed thoroughly with deionized water and gently blotted with an absorbent tissue prior to the next pH measurement.

The pH of the untreated and treated filler was measured utilizing a Fisher Scientific Accumet AR50 pH meter having a measuring resolution of 0.01 pH units equipped with an Orion Ross Combination pH Electrode with BNC connector manufactured by Thermo Electron Corporation and purchased from Fisher Scientific. The Accumet AR50 pH meter used an automatic temperature compensator (ATC) probe for solution temperature measurement. The electrode in preparation for analysis had the electrode-fill hole open and to maintain an adequate flow rate, Ross pH Electrode Fill solution (Orion product number 810007 3), molar potassium chloride (KCl) solution, was added to cover the end of the coil and was at least one inch above the sample level when immersed. After opening the fill hole and upon addition of KCl fill solution the electrode was allowed to equilibrate for at least 15 minutes in pH Buffer 7 prior to recalibration and pH analysis. To prevent the stirrer from heating the beaker during measurements, a piece of insulating material was inserted between the magnetic stirrer and the beaker. The pH meter was prepared for analysis by recalibrating the meter with pH Buffers 4, 7 and 10 that are traceable to NIST or an equivalent agency.

A filler sample weighing approximately 5.0 g+/−0.1 g was placed into a 150-mL beaker containing a magnetic Teflon round stir bar, having dimensions 1.25 inches in length and 0.313 inches in diameter. The filler sample for pH determination was ground to a powder with a mortar and pestle prior to measurement. About 100 ml of deionized water was added to the beaker containing the 5.0 g+/−0.1 g filler sample. The sample was mixed using a Fisher Thermix Stirrer Model 120MR using dial range settings of between 2 to 3. The electrode was rinsed with deionized water and gently blotted with an absorbent tissue prior to immersing into the stirring sample solution. The pH value was recorded to the nearest 0.01 pH unit when the pH Meter obtained a stable pH value reading. The electrode was removed and rinsed thoroughly with deionized water and gently blotted with an absorbent tissue prior to the next analysis.

CM10 Dispersion Test:

The following procedure, known as the CM10 dispersion test, was used to measure undispersed particles in a rubber compound as described below. The measure of non-dispersion was expressed as a CM10 count that was the sum of all the undispersed agglomerates equal to and greater than a 0.3 mm grid. For example, if there are two agglomerates in the 0.3 mm grid and one agglomerate in the 0.6 mm grid, then the CM10 count was equal to 3.

The following rubber compound was used in the CM10 dispersion test to measure the CM10 count. The-rubber compound is shown in Table 1.

TABLE 1

| Time, min | Mixer Rotor Speed, RPM | Ingredients | Weight, grams |
|---|---|---|---|
| 0 | 35 | Polymer, SBR 1778 (100 phr SBR and 37.5 phr Naphthenic Oil; Ameripol Synpol Corp.) | 668 |
| | | Red Iron Oxide Master Batch (Butyl 365, 50% Red IQ MB 18255; Poly One, Inc.) | 24.3 |
| 1.5 | 35 | Treated/Untreated Filler in Examples | 243 |
| 2 | | Calsol 510 (R. E. Carrol Inc.) mixed with 50 g silica | 63.2 |
| 4 | | Dump - Get stock temp. | |

The above ingredients were introduced and mixed in a Kobelco Stewart Bolling Model "00M" internal mixer in the order and weights given in Table 1. The mixer was preheated using the automatic temperature control unit to a temperature of 37.7 degrees C. before the ingredients were introduced. SBR 1778 and Red Iron oxide were added and mixed at 35 rpm for 1.5 minutes commenced the mixing sequence. To this mix was added filler made according to this invention and mixed for another 0.5 minute at 35 rpm. Then Calsol 510, mixed with 50 grams of silica made in accordance with this invention, was introduced to the previous mixture and mixed for an additional 2 minutes at 35 rpm. The stock was discharged from the mixer at the end of the mixing sequence. The internal mixer temperature at the end of the mixing sequence was between 70 and 85° C.

Upon completion of the mixing sequence in the mixer, the stock was transferred to the two-roll mill (Ferrel 10" mill) and the milling operation was commenced. The feedstock from the mixing sequence was placed on a cooled 2-roll mill at a temperature of from 15 and 20° C. The thickness of the mill nips was set between 0.20" to 0.25". Once the feedstock from the internal mixer bands was on the mill, two side cuts from each side and four end rolls of the rubber was performed, respectively, while milling. After milling, the rubber sheet was removed from the mill.

Two 2"×10" sections using a 2"×10" metal template were cut from each end of the sheet. Using scissors, one ten-inch strip approximately one-fourth inch wide was cut from each side of the two 2"×10" rubber slabs. Four strips or 10 square inches of the entire sheet resulted. The freshly cut side of each strip was examined under a Unitron MSL microscope. The field of vision was 10×magnification (W10×).

The red iron oxide master batch additive in this compound served as a colorant to aid in dispersion analysis. The red rubber color background highlighted non-dispersed filler. Since only one dry additive was used in this compound (filler) there were no interferences in the dispersion results from other similar dry additives. One lens of the microscope had a grid of 0.3 mm in the eyepiece. The area of each square in this grid was 0.30 mm and corresponded to 300 microns, thus two grids corresponded to 0.60 mm or 600 microns.

The criteria for observing non-dispersed filler agglomerates in the range of 300 to 600 microns was as follows: If a filler agglomerate touched two opposite lines of a square in the grid or fills in the square (0.3 mm area), this was counted as a non-dispersed agglomerate that was 300 microns in size. Any agglomerate touching two opposite lines from two adjacent squares in the grid or fills in two squares of the grid (0.6 mm area) was counted as a non-dispersed agglomerate that was 600 microns in size. If a non-dispersed filler agglomerate was observed to be larger than one square in the grid but not as large as two squares in the grid then its size was counted as being in the range of 300 to 600 microns and the count/observation was placed in the 300 microns non-dispersed filler count. A similar procedure was used to count non-dispersed filler agglomerates that were larger than two squares in the grid. This data was recorded in the 600 microns and larger non-dispersed agglomerate range.

Mooney viscosity was measured using an automated Mooney Viscometer (MV 2000) with a large rotor, manufactured by Alpha Technologies, Inc. Two pieces of uncured rubber, each with approximate dimensions of 4 cm×4 cm×¼ inch thick were cut from the rubber master batch. A hole was cut in one of the pieces to hasten the loading of the rotor. The piece with the hole was placed on a sheet of Mylar film (2 mil thickness, cut into 4 cm by 4 cm squares) to prevent the compound from sticking to the die cavity. The large rotor was then placed in between the dies of the Mooney Viscometer. The platen press was heated to a temperature of 100° C. and the temperature was allowed to stabilize. When the Mooney Viscometer was ready for the test, a green light was illuminated. At that point, the platens were opened and the rotor stem was inserted through the piece of rubber with the hole in it. The second rubber piece was placed on top of the rotor and the rotor was placed back in the heated die cavity and platens were closed. The shield and platens opened when the test was complete.

The following probe sonication procedure was used for analyzing the friability of a filler pellet. A Fisher Scientific Sonic Dismembrator, Model 550 with a tapered horn and a flat tip (probe) was used to breakdown the agglomerates as function of time. The resulting particle size was measured by a laser diffraction particle size instrument, LS 230 manufactured by Beckman Coulter, capable of measuring particle diameters as small as 0.04 micron. Approximately 2 g equivalent of filler, adjusted for moisture, was weighed into a 2 oz wide-mouth bottle containing a 1" stir bar, and 50 ml of water was then added to the bottle using a graduated cylinder. After stirring for one minute, the bottle was placed in an ice bath and the sonicator probe was inserted into the bottle such that there was a 4 cm probe immersion in the slurry. The sonication amplitude was adjusted for the desired intensity of 6. The sonication amplitude was related to the sonication power in watts and calculated in accordance with the procedure described in "Method 3051: Microwave Assisted Acid Digestion of Sediments, Sludges, Soils and Oils," under Section 7: Calibration of Microwave Equipment, U.S. Environmental Protection Agency, SW-846, Version 2, December 1997.

The sonicator was run in the continuous mode in 60 second increments until 420 seconds was reached. An aliquot of sample was withdrawn and the particle size was measured by light scattering using a LS 230 (manufactured by Beckman Coulter, Inc.). A filler pellet was deemed to be more friable if it had a smaller mean agglomerate diameter after sonication at a given amplitude setting and time duration than prior to sonication. Friability is defined as the mean particle diameter (micron) after 420 second sonication.

Example 1

In a 49,000 gallons stainless steel reactor with a central agitator, 14,000 gallons of sodium silicate with an $Na_2O$ concentration of 89 g/l was mixed with 27,000 gallons of water to give 41,000 gallons of sodium silicate solution containing 30.4 g/l $Na_2O$. The central agitator was rotated at 45 rpm throughout the reaction. Live steam was used to raise the temperature of the foreshot to 142° F. (61° C.). The solution was carbonated over 4 hours using a fast-slow-fast carbonation cycle or until the pH of the reactor slurry reached 9.3. 100% $CO_2$ gas was introduced below the turbine blade through a 6" pipe and the $CO_2$ flow was controlled using a mass flow meter. The $CO_2$ flow rates and the total amount of $CO_2$ used in the reaction are shown below in Table 2.

TABLE 2

| Carbonation Cycle | Time, hours | $CO_2$ Flow rates, $ft^3$ STP/min |
|---|---|---|
| Fast | 0 | 310 |
| Fast | 1 | 310 |
| Slow | 2 | 241 |
| Fast | 3 | 400 |
| End | 4 | Stop $CO_2$ flow |
| | Total $CO_2$ consumption | 75,660 $ft^3$ STP |

The temperature in the reactor increased gradually to 153° F. (67° C.) after 3.5 hours from the start of the precipitation. At that time, the steam coils were opened fully to increase the temperature of the reactor slurry to 210° F. (99° C.). The slurry temperature reached 210° F. after 4.5 hours from the start of the precipitation. The slurry was aged for 5 minutes at 210° F. The slurry was then pumped to a raw slurry storage tank (RST) with a capacity of 150,000 gallons. This precipitation was repeated continuously. The temperature of the slurry in the raw slurry storage tank was typically around 180° F. (82.2° C.).

300 gallons/min of slurry was pumped from the raw slurry storage tank, also known as RST slurry, was pumped to a series of decantation tanks, at 125-150° F. (51.6-65.5° C.), to remove the carbonate and bicarbonate by products formed in the precipitators. The first decantation tank had 1.5 million gallon capacity and was equipped with a tank scraper that made one revolution in every 45 minutes. The slurry was introduced near the top of the first decantation tank and it took about 8 hours for the silica in the slurry to settle at the bottom of the tank. The overflow from the second decantation tank was mixed with a cationic flocculant solution (WT-40P with 40 weigth % active flocculent, purchased from Ciba Specialty Chemicals), 0.25% by weight of silica, and introduced at the top of the first decantation tank. The solids content of the settled slurry from the bottom of the tank, also called first underflow (1UF) slurry, was 3.5% by weight and its pH was around 9.6. The wash water from the top of the first decantation, 1470 gallons/min, also called first overflow (1OF) water was pumped to the sewer.

820 gallons/min of the underflow slurry from the first decantation tank was pumped to the second decantation tank with 1.5 million gallons capacity. The slurry was introduced near the top of the tank and it took about 8 hours for the silica in the slurry to the settle at the bottom of the tank. The solids content of settled slurry from the bottom of the tank, also called second underflow slurry, was 2.5% by weight and its pH was around 9.1. The wash water from the top of the second decantation, 2000 gallons/min, also called second overflow (2OF) water was pumped to the top of the first decantation tank.

1300 gallons/min of the second underflow (2UF) slurry from the second decantation tank was pumped to an acidification tank and was neutralized with 6 Normal HCl. Typically 8-10 gallons/min of HCl are used to neutralize the second underflow slurry. The pH in the acidification tank was 3.5. The slurry from the acidification tank was introduced into the third decantation tank, also with 1.5 million gallons capacity. The slurry was introduced near the top of the tank, and it took about 8 hours for the silica in the slurry to the settle at the bottom of the tank. The solids content of the settled slurry from the bottom of the tank, also called third underflow (3UF) slurry, was 6.5% by weight and its pH was around 5.1. The wash water from the top of the third decantation tank, 2470 gallons/min, also called third overflow (3OF) water was pumped to the top of the second decantation tank. Fresh water, at a flow rate of 1550 gallons/min, was introduced at the top of the tank to complete the decantation cycle.

380 gallons/min of the third underflow (3UF) slurry was passed through a Kason screen with 120-mesh opening (125 microns in diameter) to remove silica agglomerates larger than 125 microns in diameter. The portion of the slurry with silica agglomerates larger than 125 microns, also called Kason oversize slurry, was recycled back to the second decantation tank. The portion of slurry that went through the Kason screen, also called Kason undersize slurry, had 5.5% by weight of silica. The pH of the slurry was around 5.3. This precipitation was repeated continuously.

Example 1a 180 gal of Kason undersize slurry was used to make the control sample (untreated filler) used in Example 1. This 180 gal of slurry was split into three batches of 60 gal. Each 60 gal of slurry was filtered using a Perrin Pilot filter press with 5 plates (Model No: Perrin #200 Chambers: 30 inches×19 plates). Filter press fill pressure was 20 psi. The amount of wash water used was around 250 gallons. The % by weight of silica in the resulting filter cake was 16.5%. The filter cake was introduced directly into a custom built tumbling rotary dryer (Dimensions—48 inches, Length—7.5 inches, Air flow—20 LPM) rotating at a speed of 35 rpm. A temperature of 300° F. (149° C.) was used to dry the filter cake and a flow of air was used to remove the evaporated water from the dryer. After about 3 hours, dry silica pellets with less than 1% moisture by weight were discharged from the rotary dryer. The dry pellets were then screened through −7 mesh and +28 mesh screens to obtain a pellet fraction between 2800 and 600 microns. The dry silica pellets were conditioned in a humidity controlled room maintained at a temperature of 22° C. and a relative humidity of 50% to raise the moisture content to about 5-6% by weight.

The Kason undersize slurry was reacted with ammonium stearate (AMS) emulsion to obtain desired target values of AMS in the final product. The AMS emulsion containing 27 percent by weight of active ammonium stearate (Geo Specialty Chemicals, Inc.) or 33 percent by weight of active ammonium stearate (Bradford Soaps, Inc.) was used.

Example 1b

The 1 wt % AMS treated filler was prepared by reacting 151 liters of Kason undersize slurry with 170 grams of 27% AMS emulsion at 150° F. (65.5° C.). Upon completion of the AMS addition, the reacted slurry was aged for 15 minutes. After aging, the slurry was neutralized to a pH of 5.5 with concentrated sulfuric acid. The treated slurry was filtered in the filter press with 4 plates as described above. The % by weight of silica in the resulting filter cake was 16.3%. The filter cake was rotary dried as described above. The dry pellets were then screened through −7 mesh and +28 mesh screen to obtain a pellet fraction between 2800 and 600 microns. The dry silica pellets were conditioned in a humidity controlled room maintained at a relative humidity of 50% to raise the moisture content to about 5-6% by weight.

Example 1c

The 3 wt % AMS treated filler was prepared by reacting 151 liters of Kason undersize slurry with 1023 grams of 27% AMS emulsion as described in the previous paragraph. After treatment, the slurry was filtered in the press with 4 plates as described above. The % by weight of silica in the resulting filter cake was 16.3%. The filter cake was rotary dried as described above. The dry pellets were then screened through −7 mesh and +28 mesh screen to obtain a pellet fraction between 2800 and 600 microns. The dry silica pellets were conditioned in a humidity controlled room maintained at a relative humidity of 50% to raise the moisture content to about 5-6% by weight.

Comparative Pellet Preparation:

The rotary dryer discharge of the untreated filler was milled in a hammer mill (Type: SH, Mikro Pulverizer Company) to obtain a powder with a median particle diameter of 30 microns. The hammer-milled powder was fed to a pelletizer type pin mixer (Model 8D32L, Woodward Inc.). The hammer-milled silica powder was fed into the pin mixer using a screw feeder (Tecweigh screw). A feed rate of 7.5 pounds per minute was used. The percent wet cake moisture desired in the product fixes the amount of water used to pelletize the powder in the pin mixer. The wet cake from the pin mixer had 64 percent by weight of water. The water spray pressure and motor speed were adjusted between 8-30 pounds per square inch and 1400-1700 revolutions per minute, respectively, to obtain pelletized wet cake with good consistency, i.e. essentially the same % moisture by weight. The amount of ammonium stearate added by weight of silica in the pin mixer was varied by adding differing amounts of ammonium stearate emulsion to the pin mixer water. A re-circulating pump was used to keep the ammonium stearate substantially uniformly dispersed in the pin mixer water.

Example 1d

For this untreated comparative sample, 10 lbs of water was used to pelletize the powder in the pin mixer at the powder feed rate of 7.5 pounds per minute.

Example 1e

For 1 wt % AMS treatment, 0.3 lbs of 27 wt % AMS emulsion was added to 9.7 lbs of water used to palletize the powder in the pin mixer at the powder feed rate of 7.5 pounds per minute.

Example 1f

For 3 wt % AMS treatment, 0.6 lbs of 27 wt % AMS emulsion was added to 9.4 lbs of water used to palletize the powder in the pin mixer at the powder feed rate of 7.5 pounds per minute.

For Examples 1d, 1e and 1f, the wet cake from the pin mixer was dried in a Despatch convection oven (Model: LAC1-38B, Despatch Industries, Inc., Box 1320, Minneapolis, Minn. 55440) at a temperature of 125° C. for 8 hours to obtain dry pellets. The dry pellets were then screened through −7 mesh and +28 mesh pellet screen to obtain a pellet fraction between 2800 and 600 microns.

Pellet samples of Examples 1a through 1f were tested for 5 Pt BET surface area, CTAB surface area, ATD, CM10 count, and Mooney viscosity according to the methods described previously. The data are listed in Table 3.

TABLE 3

| Description | 5 Pt BET | CTAB | ATD | CM10 Count | Mooney |
|---|---|---|---|---|---|
| Example 1a | 157 | 134 | 240 | 29 | 85 |
| Example 1b | 139 | 136 | 231 | 16 | 85 |
| Example 1c | 111 | 146 | 201 | 5 | 76 |
| Example 1d | 130 | 130 | 316 | 86 | 93 |
| Example 1e | 124 | 130 | 325 | 158 | 94.5 |
| Example 1f | 108 | 138 | 345 | 294 | 93 |

Each CM10 count and Mooney data point represents an average of two rubber batches.

Comparison of the ATD data of the treated fillers (1b, 1c) according to this invention with the ATD of comparative pellets (1e, 1f) made by reacting the rotary dried and hammer-milled untreated filler with AMS in a pin mixer and then oven drying and screening the pin mixer discharge (shown in Table 3) indicates that the treated fillers according to this invention have lower ATD than the treated comparative pellets. In addition, ATD of the treated fillers according to this invention decreased with increasing level of treatment compared to the comparative pellets where the ATD increased with increasing level of treatment.

The results in Table 3 demonstrate that the treated fillers according to this invention had lower CM10 counts compared to pellets made by reacting the rotary dried and hammer-milled untreated filler with AMS in a pin mixer and then oven drying and screening the pin mixer discharge. In addition, the CM10 count of the treated filler according to this invention decreased with increasing level of treatment compared to the pellets where the CM10 count increased with increasing level of treatment.

The Mooney viscosity of the treated fillers according to this invention was lower than the comparative pellets made by reacting the rotary dried and hammer-milled untreated filler with AMS in a pin mixer and then oven drying and screening the pin mixer discharge.

Example 2

Examples 2a and 2b were rotary dried; Examples 2c and 2d were spray dried and granulated; and Examples 2e and 2f were oven dried.

Example 2a 20 liters of RST slurry from a precipitation process carried out as in Example 1 was reacted with 5 grams of cationic flocculant (WT-40P) and neutralized with concentrated sulfuric acid to a pH of 5.1. The neutralized slurry was filtered in two Buchner funnels. The filter cake in each funnel was then washed with 10 liters of water. The resulting filter cake, that had 17% by weight of silica, was rotary dried, screened, and conditioned in a humidity control room as described earlier in Example 1.

Example 2b

Another 20 liters of RST slurry from a precipitation process carried out as in Example 1 was reacted with 5 grams of cationic flocculant (WT-40P) and 68 grams of 33% AMS solution and then neutralized with concentrated sulfuric acid to a pH of 5.3. The neutralized slurry was filtered in two Buchner funnels. The filter cake in each funnel was then washed with 10 liters of water. The resulting filter cake, that had 16.4% by weight of silica, was rotary dried, screened, and equilibrated in a humidity control room as described earlier in Example 1.

Example 2c 50 liters of RST slurry from a precipitation process carried out as in Example 1 was neutralized with concentrated sulfuric acid to a pH of 6.0 and diluted with 100 liters of water in a stainless steel 150-liter reactor and heated to 150° F. (65.5° C.) under agitation. The agitation and heat was turned off and the slurry allowed to settle overnight. The clear supernatant was siphoned off and 80 liters of settled slurry was collected.

20 liters of the 80 liters of the settled slurry from the previous step was filtered using two Buchner funnels. The filter cake in each of the funnels was washed with 10 liters of water. The resulting filter cake, that had 16.7% by weight of silica, was reslurried with just enough water and with agitation to produce a pumpable slurry which was then spray dried in a Niro spray dryer (Utility Model 5 with Type FU-11 rotary atomizer, Niro Inc.).

Granules were prepared from the spray dried powder samples by compaction using the Alexanderwerck, Roller Compactor WP 120/40, granulator (roll diameter 120 mm, roller height 40 mm, rotary speed of rolls 4-15 rpm). The granulation pressure applied by the rolls of the granulator was 25 Bar.

Example 2d

Another 20 liters of the 80 liters of the settled slurry from Example 2c were treated with 143 grams of 33% AMS solution at 150° F., aged for 15 minutes, and neutralized with sulfuric acid to a pH of 5.0. The treated slurry was filtered using two Buchner funnels. The filter cake in each of the funnels was washed with 10 liters of water. The resulting filter cake, that had 16.10% by weight of silica, was reslurried with just enough water and with agitation to produce a pumpable slurry which was then spray dried in a Niro spray dryer with a rotary atomizer. The spray dried powder was granulated under conditions described in Example 2c.

Example 2e 20 liters of the 80 liters of the settled slurry from Example 2c was filtered using two Buchner funnels. The filter cake in each of the funnels was washed with 10 liters of water. The resulting filter cake, that had 16.7% by weight of silica, was dried in a Despatch convection oven (Model: LAC1-38B, Despatch Industries, Inc., Box 1320, Minneapolis, Minn. 55440)) at a temperature of 257° F. (125° C.) for 12 hours to obtain dried pellets. The dried pellets were then screened and conditioned in a humidity control room as described earlier in Example 1.

Example 2f 20 liters of the 80 liters of the settled slurry from Example 2c were treated with 143 grams of 33% AMS solution at 150°

F., aged for 15 minutes, and neutralized with sulfuric acid to a pH of 5.0. The treated slurry was filtered using two Buchner funnels. The filter cake in each of the funnels was washed with 10 liters of water. The resulting filter cake, that had 16.10% by weight of silica, was dried in a convection oven as described in the previous paragraph. The dried pellets were then screened and equilibrated in a humidity control room as described earlier in Example 1.

Pellet samples of Examples 2a through 2f were tested for 5 Pt BET surface area, CTAB surface area, ATD, CM10 count, and Mooney viscosity according to the methods described above.

TABLE 4

| Example | 5 Pt SA | CTAB | ATD | CM10 Count | Mooney |
|---|---|---|---|---|---|
| Example 2a | 133 | 134 | 258 | 13 | 79 |
| Example 2b | 121 | 137 | 194 | 3 | 75 |
| Example 2c | 147 | 138 | 287 | 36 | 76 |
| Example 2d | 129 | 147 | 277 | 3 | 73.5 |
| Example 2e | 140 | 138 | 266 | 64 | 83 |
| Example 2f | 122 | 144 | 167 | 1 | 74 |

The results in Table 4 demonstrate that treated fillers (2b, 2d, 2f) according to the invention exhibited lower ATD than untreated fillers (2a, 2c, 2e) regardless of the drying method employed. In addition, treated fillers (2b, 2d, 2f) according to the invention had significantly lower CM10 count and lower Mooney viscosity compared to untreated fillers (2a, 2c, 2e). These results indicate that treated fillers according to the invention were more dispersible compared to untreated fillers regardless of the drying method employed to prepare treated filler.

Example 3

Example 3a 50 liters of 2UF slurry from a precipitation process carried out as in Example 1 were neutralized with concentrated sulfuric acid to a pH of 6.0 and screened through 100 mesh sieve (Fisher Scientific Company, ASTM E-11 specification), and diluted with 100 liters with of water and decanted. The clear supernatant was siphoned off and the settled slurry with 6.5 wt % of silica was filtered in five Buchner funnels. The filter cake in each funnel was washed with 5 liters of water. The resulting filter cake was rotary dried, screened, and conditioned in a humidity control room as described earlier in Example 1.

Example 3b

Another 50 liters of 2UF slurry from a precipitation process carried out as in Example 1 were neutralized with concentrated sulfuric acid to a pH of 6.0, screened through a 100 mesh sieve (Fisher Scientific Company, ASTM E-11 specification), and diluted with 100 liters of water and decanted. The clear supernatant was siphoned off and the settled slurry that weighed 109 lbs and had 6.5 wt % of silica, was reacted with 109 grams of 33% AMS solution and neutralized with concentrated sulfuric acid to a pH of 5.5. The neutralized slurry was filtered in five Buchner funnel. Filter cake in each funnel was washed with 7.5 liters of water. The resulting filter cake was rotary dried, screened, and conditioned in a humidity control room as described in Example 1.

Pellet samples of Examples 3a and 3b were tested for 5 Pt BET surface areas, CTAB surface area, ATD, CM10 count, Mooney viscosity, and Friability according to the methods described above.

TABLE 5

| Example | 5 Pt SA | CTAB | ATD | CM10 Count | Mooney | Friability |
|---|---|---|---|---|---|---|
| Example 3a | 148 | 138 | 260 | 26 | 78.98 | 7.5 |
| Example 3b | 115 | 141 | 236 | 9.5 | 76.28 | 3.6 |

The results in Table 5 demonstrate that treated filler (3b) according to the invention exhibited lower ATD, had significantly lower CM10 count, and lower Mooney viscosity than untreated filler (3a). In addition, treated filler (3b) according to the invention was more friable compared to untreated filler (3a) as demonstrated by the lower friability value of treated filler (3b).

Battery Separator Examples

In Examples 4-11, various treated fillers of the present invention were incorporated into battery separators. The resulting separator material was evaluated for electrical resistance and puncture resistance. Lowering the separator electrical resistance can be a desired improvement. Increasing puncture resistance can be another desired improvement. Either improvement, alone or in combination, can allow for greater flexibility in separator manufacture and/or a higher level of performance.

Battery Separator Evaluation Procedures for Examples 4-11

The battery separator formulations listed in Table 6 were used to evaluate the performance of battery separators made with treated fillers of the present invention and untreated fillers.

TABLE 6

Battery Separator Formulations Used in Examples

| Ingredient | Manufacturer | Formula 1 (g) | Formula 2 (g) |
|---|---|---|---|
| Silica @ 5.0% moisture | PPG | 2270 | 2270 |
| UHMWPE GUR 4150 | Ticona | 1081 | 841 |
| Polyblak 3723 | A. Schulman, Inc | 108 | 84 |
| Irganox B-215 | Ciba Specialty Chemicals | 18.38 | 14.3 |
| Synpro 1580 | Ferro Corporation | 18.38 | 14.3 |
| Calsol 580 Oil | Calumet Lubricants Co. | 4634 | — |
| Shellflex 3681 | Shell Oil Company | — | 4268 |

The dry ingredients were weighed into a Littleford plough blade mixer with one high intensity chopper style mixing blade. Model # for the mixer was FM-130D. The dry ingredients were premixed for 15 seconds using the plough blades only. The process oil, Calsol 580 or Shellflex 3681, was then pumped in via a hand pump through a spray nozzle at the top of the mixer, with only the plough blades running. The pumping time for the examples varied between 45-60 seconds. The high intensity chopper blade was turned on, along with the plough blades, and the mix was mixed for 30 seconds. The mixer was shut off and the internal sides of the mixer were scrapped down to insure all ingredients were evenly mixed. The mixer was turned back on with both high intensity chopper and plough blades turned on, and the mix was mixed for an additional 30 seconds. The mixer was turned off and the mix dumped into a storage container.

The mixed formulas were extruded and calendered into battery separator sheets. The extrusion system consisted of a feeding, extrusion and calendering system as described below.

A gravimetric loss in weight feed system (K-tron model # K2MLT35D5) was used to feed the blend into the extruder. The extruder was a 27 mm twin screw extruder. The model # was Leistritz Micro-27 gg. The extruder barrel comprised of eight temperature zones and a heated adaptor to the sheet die. The extrusion mixture feed port was located just prior to the first temperature zone. An atmospheric vent was located in the third temperature zone. A vacuum vent was located in the seventh temperature zone.

The calendering was accomplished using a three-roll vertical calender stack with one nip point and one cooling roll. Roll dimensions were approximately 41 cm in length and 14 cm in diameter. The top roll temperature was maintained between 140° C. to 145° C. and rotated at a nominal rate of 4 RPM. The middle roll temperature was maintained between 150° C. to 152° C. and rotated at a nominal rate of 7 RPM. The bottom roll was a cooling roll wherein the temperature was maintained between 10-21° C. and rotational speed was nominally 7 RPM. The rolls had a chrome surface.

The mix was fed into the extruder at a nominal rate of 100 g/minute. Additional Calsol® 580 processing oil was also injected at the first temperature zone during extrusion to bring the total oil content in the extruded product to 65.5-66.5 weight percent.

Extrudate from the barrel was discharged into a 15-centimeter wide sheet Masterflex® die having a 1.5 millimeter discharge opening. The extrusion melt temperature was 203-210° C. The throughput was 7.5 kilograms per hour. The extrudate was calendered to a sheet 0.19-0.23 mm thick and 195 mm wide. The extruded sheet was passed over a water cooled roll, wound up and set aside as a sample.

Sample Preparation:

Individual samples (127×114 mm) were die cut from the larger sample, placed into a mixture of 12 weight percent Calsol 580 processing oil and 88 weight percent trichloroethylene, for one hour, then air dried for at least 30 minutes at room temperature. These samples were used to measure electrical resistance and puncture resistance of the battery separator sheet.

Electrical Resistance Testing:

Two of the extracted, dried samples were boiled in water for ten minutes, soaked in sulfuric acid (specific gravity=1.281±0.005 @26.7° C.) for 20 minutes, and tested for electrical resistance using a Palico low resistance measuring system Model 9100-2 (Palico Instrument Laboratories, Circle Pines, Minn.) as follows: Palico test cell was brought up to a temperature of 26.7° C. Two of the separators that were boiled in water and soaked in sulfuric acid were placed in the open slot of the Palico test cell as a pair. All air bubbles that were clinging to the separators were removed via tapping with a glass rod and the separators checked to insure they were positioned against the bottom of the cell. The jaws of the Palico test cell were closed snugly against the separators and the cell resistance zeroed. The separators were removed without moving the cell jaws and the electrical resistance again read. This value was designated as a raw electrical resistance (ERraw). The test cell had a opening of 5 in². The ER10 electrical resistance value was calculated using the formula ER10=(ERraw (mohm)*5 in²)/(2*average separator thickness (mils)) to give a final ER10 value with the units of mohm*in² standardized to a 10 mil thickness. For metric units, the above calculated ER10 value can be multiplied by 6.45 to convert the results to the metric units of mohm*cm² standardized to a thickness of 0.0254 cm. The result is a standard ten-minute boil electrical resistance, abbreviated "ER10". Since this value is obtained under standard conditions, it is a characteristic of the filler used in the battery separator formulation.

Puncture Resistance Testing:

The extracted dried samples were measured for thickness at three different locations near the center of each sample. An average thickness was calculated from the three readings. An Ono Sokki electronic thickness gage, model EG225, was used to measure the thickness.

A Chatillion digital force gage, model TCD200, was used to measure puncture resistance. A rounded bottom metal probe with a diameter of 1.9 mm was mounted in the force gage and traveled at 500 mm/min. until the separator sample was punctured. The force required to puncture the separator was recorded in pounds and this force value then divided by the sample thickness to give a puncture resistance in force per unit thickness; ounces per mill, for example.

Each sample was tested for puncture resistance at three different locations near where the thickness measurements were taken and the three values averaged to give one average puncture resistance value for each of the three sheets. These three average values were then averaged to give one combined average value for all three samples (i.e., puncture resistance).

Titration Methods Used for Examples 5 through 11:

In the preparation of Examples 5 through 11, the following methods were used to determine $Na_2O$ strength of the precipitation heel and the acid number of the precipitation heel and of the slurry during the simultaneous addition step.

$Na_2O$ Titration:
1. Pipette 20 ml of the sample to be tested.
2. Discharge contents of the pipette into a beaker equipped with a magnetic stir bar.
2. Dilute the sample in the beaker with roughly 100 ml of deionized water.
3. Place the beaker on a magnetic stir plate and agitate the sample moderately.
4. Add approximately 10 drops of Methyl Orange-Xylene Cyanole indicator. The color of the solution in the beaker should be green.
5. Titrate with 0.645N HCl from a 50 ml burette. End of titration will be indicated when the color of the solution turns purple.
6. Read the milliliters of 0.645N HCl added. This value is the grams per liter of Na2O in the sample.

Acid Value Titration:
1. Pipette 50 ml of the reactor contents.
2. Discharge the contents of the pipette into a beaker equipped with a magnetic stir bar.
3. Dilute the sample in the beaker with roughly 100 ml of deionized water.
4. Place the sample on a magnetic stir plate and agitate moderately.
5. Add approximately 6 drops of phenolphthalein indicator. The color of the solution in the beaker should be pink.
6. Titrate with 0.645N HCl from a 50 ml burette. End of titration will be indicated when the color of the solution turns clear.
7. Read the milliliters of 0.645N HCl added.
8. Acid value=(ml of 0.645N HCl)*(64.5)

Precipitation Equipment Used in Examples 5 through 11:

The reactor was a round bottom 150 liter stainless steel tank. The tank had two 5 cm baffles placed vertically on opposite sides of the inside of the tank for added mixing. Heating was via steam coils located 46.4 cm down from the top of the tank. The tank had two agitators. Main agitation was accomplished via an Ekato MIG style blade and a secondary high speed agitator was used for acid addition with a cowles style blade turning at 1750 RPM. The secondary high speed agitator was only run when acid was being added to the tank.

Common Raw Materials Used in Examples 5-11:
Sodium silicate—70 g/l Na2O with a $SiO_2/Na_2O$ ratio of 3.2
Sulfuric acid—96%, 36 N

Example 4

Example 4a 20 liters of 1UF slurry from a precipitation process carried out as in Example 1 was neutralized with concentrated sulfuric acid to a pH of 6.0 and screened through a 100 mesh sieve and diluted with water 50 liters of water in a stainless steel reactor. Under agitation, the slurry was heated to 158° F. After 15 minutes, the agitation and heat were shut off and the slurry was allowed to decant overnight. Next morning, the clear supernatant was siphoned off and the settled slurry, that had 5.3 wt % of silica, was filtered in two buchner funnels. The filter cake in each funnel was washed with 10 liters of water. The resulting filter cake had 17.8 wt % of silica. The resulting filter cake was rotary dried, screened, and equilibrated in a humidity control room as described earlier in Example 1.

Examples 4b through 4k

For Example 4b, 80 liters of 1UF from a precipitation process carried out as in Example 1 was neutralized with concentrated sulfuric acid to a pH of 6.0 and screened through a 100 mesh sieve and diluted with water 200 liters of water in a stainless steel reactor. Under agitation, the slurry was heated to 158° F. After 15 minutes, the agitation and heat were shut off and the slurry was allowed to decant overnight. Next morning, the clear supernatant was siphoned off and the settled slurry, that had 5.3 wt % of silica was collected for treatment.

The process used for Example 4b was followed for Examples 4c through 4k with the following exceptions: 90 liters of 1UF slurry was used and 225 liters of water were used for dilution.

Examples 4b through 4k were treated using the treating materials shown in Table 7.

For Examples 4b to 4d and 4h to 4k, the treatments were done at 200° F. (93.3° C.) and the treating material was dissolved in 2 liters of water at 200° F.

For Examples 4e, 4f and 4g, the treatments were done at 158° F. and the treating material was used as-is.

Examples 4l through 4t 90 liters of 2UF from a precipitation process carried out as in Example 1 was neutralized with concentrated sulfuric acid to a pH of 6.0, screened through a 100 mesh sieve, and diluted with 225 liters of water in a stainless steel reactor. Under agitation, the slurry was heated to 158° F. After 15 minutes, the agitation and heat were shut off and the slurry was allowed to decant overnight. Next morning, the clear supernatant was siphoned off and the settled slurry, that had 5.3 wt % of silica was collected.

Examples 4m through 4t were treated using the treating materials shown in Table 7.

For Examples 4m and 4q through 4t, the treatments were done at 200° F. and the treating material was dissolved in 2 liters of water at 200° F.

For Examples 4n, 4o and 4p, the treatments were done at 158° F. and the treating material was used as-is.

Examples 4b through 4t were neutralized with concentrated sulfuric acid to a pH of 6.0. The neutralized slurry was filtered in Buchner funnels. The Buchner funnel had a capacity of 10 liters. The filter cake in each funnel was washed with 5 liters of water. The resulting filter cakes had between 16-17% by weight of filler and were rotary dried, screened, and conditioned in a humidity control room as described earlier in Example 1.

Pellet samples of Examples 4a and 4l and hammer milled samples of 4b through 4k and 4m through 4t were tested for 5 Pt BET surface area. Pellet samples of 4a through 4t were tested for CTAB surface area, ATD, CM10 count, and Mooney viscosity according to the methods described previously. The data are listed in Table 8.

Pellet samples of Examples 4b, 4d, 4e, 4g, 4j, 4k, 4q, 4r, 4s and 4t were extruded into battery separators using formulation #1 listed in Table 6 and the resulting battery separators were tested for electrical resistance and puncture resistance using the procedures described above. The results are listed in Table 9.

TABLE 7

| Example 4 | Treatment | Treatment Material | Treatment Amount, grams | Amount of Slurry |
| --- | --- | --- | --- | --- |
| Example 4a | None | None | 0 | 20 liters |
| Example 4b | 2% OP-100 (CPH Solutions Corp.) | sodium stearate | 86.4 | 80 liters |
| Example 4c | 4% OP-100 (CPH Solutions Corp.) | sodium stearate | 173 | 80 liters |
| Example 4d | 6% OP-100 (CPH Solutions Corp.) | sodium stearate | 289 | 90 liters |
| Example 4e | 2% Octosol 730 (Tiarco Chemicals) | 15% Ammonium Cocoate solution. | 655 | 90 liters |
| Example 4f | 4% Octosol 730 (Tiarco Chemicals) | 15% Ammonium Cocoate solution. | 1309 | 90 liters |
| Example 4g | 6% Octosol 730 (Tiarco Chemicals) | 15% Ammonium Cocoate solution. | 1963 | 90 liters |

TABLE 7-continued

| Example 4 | Treatment | Treatment Material | Treatment Amount, grams | Amount of Slurry |
|---|---|---|---|---|
| Example 4h | 2% Prifer 1634 (Uniqema, Inc.) | Sodium soap of C16-C18 fatty acids | 97.2 | 90 liters |
| Example 4i | 6% Prifer 1634 (Uniqema, Inc.) | Sodium soap of C16-C18 fatty acids | 292 | 90 liters |
| Example 4j | 2% Prisavon 1866 (Uniqema, Inc.) | Sodium soap of tallow/Coconut | 96.5 | 90 liters |
| Example 4k | 6% Prisavon 1866 (Uniqema, Inc.) | Sodium soap of tallow/Coconut | 293 | 90 liters |
| Example 4l | None | None | 0 | 90 liters |
| Example 4m | 4% Prisavon 1877 (Uniqema, Inc.) | Sodium soap of tallow | 168.2 | 90 liters |
| Example 4n | 6% AMS emulsion (Bradford Soaps, Inc.) | 33% ammonium stearate | 253 | 90 liters |
| Example 4o | 12% AMS emulsion (Bradford Soaps, Inc.) | 33% ammonium stearate | 508 | 90 liters |
| Example 4p | 18% AMS emulsion (Bradford Soaps, Inc.) | 33% ammonium stearate | 760 | 90 liters |
| Example 4q | 4% Perlastan C-30 (Struktol Company) | sodium cocoyl sarcosinate | 529 | 90 liters |
| Example 4r | 4% Perlastan L-30 (Struktol Company) | sodium lauroyl sarcosinate | 524 | 90 liters |
| Example 4s | 4% Perlastan M-30 (Lot# 7500018) (Struktol Company) | sodium myristoyl sarcosinate | 526 | 90 liters |
| Example 4t | 12% Perlastan SCV (Lot# 4166201) (Struktol Company) | stearoyl sarcosine acid | 528 | 90 liters |

TABLE 8

| Description | 5 pt. BET surface area ($m^2/g$) | CTAB surface area ($m^2/g$) | Pellet ATD g/l | Mooney |
|---|---|---|---|---|
| Example 4a | 153.5 | 139 | 246 | 83 |
| Example 4b | 118 | 140 | 203 | 60 |
| Example 4c | 107 | 146 | 184 | 58 |
| Example 4d | 101 | 151 | 165 | 52 |
| Example 4e | 120 | 138 | 188 | 61 |
| Example 4f | 113 | 143.5 | 177 | 58 |
| Example 4g | 109 | 153 | 161 | 65 |
| Example 4h | 114 | 139 | 192 | 67 |
| Example 4i | 102 | 151 | 198 | 47 |
| Example 4j | 118 | 144 | 185 | 68 |
| Example 4k | 102 | 156 | 183 | 62 |
| Example 4l | 141 | 140 | 241 | 79 |
| Example 4m | 113 | 147.5 | 188 | 71 |
| Example 4n | 117 | 144 | 216 | 75 |
| Example 4o | 107 | 146 | 171 | 71.5 |
| Example 4p | 99 | 154 | 185 | 69 |
| Example 4q | 118 | 141 | 174 | 71 |
| Example 4r | 127 | 143 | 187 | 80 |
| Example 4s | 116 | 143.5 | 167 | 65.5 |
| Example 4t | 92 | 160 | 166 | 49 |

The results in Table 8 demonstrate that treated fillers (4b to 4k and 4m to 4t) according to the invention exhibited lower ATD and exhibited lower Mooney viscosity than untreated filler (4a and 4l). These results indicate that treated fillers according to the invention are more dispersible compared to untreated filler.

TABLE 9

| Filler Example # | Treatment | % treatment | ER10* | Puncture oz/mil |
|---|---|---|---|---|
| 4b | Sodium Stearate | 2.0 | 13.3 | 4.0 |
| 4d | Sodium Stearate | 6.0 | 13.6 | 4.3 |
| 4e | Ammonium Cocoate | 2.0 | 14.8 | 4.0 |
| 4g | Ammonium Cocoate | 6.0 | 13.1 | 4.3 |
| 4j | Prisavon 1866 | 2.0 | 13.7 | 4.2 |
| 4k | Prisavon 1866 | 6.0 | 12.5 | 4.3 |
| 4q | Perlastan C30 | 4.0 | 13.8 | 4.3 |
| 4r | Perlastan L30 | 4.0 | 13.6 | 4.3 |
| 4s | Perlastan M30 | 4.0 | 12.2 | 4.4 |
| 4t | Perlastan SCV | 12.0 | 9.6 | 4.9 |

*Note - ER10 values given in units of mohm * $in^2$ and standardized to a thickness of 10 mils.

Example 5

Example 5a—(1% Ammonium Stearate Treated Sample)

67.8 liters of water were added to the 150 liter reactor tank and heated to 82° C. via indirect steam coil heat. 2.2 liters of sodium silicate were added at a rate of 440.4 ml/min. to achieve a target $Na_2O$ concentration of 2.2 g/l $Na_2O$ and an acid value of 6.7. The $Na_2O$ concentration and acid value were confirmed by titrating the sodium silicate/water mixture using the $Na_2O$ titration method and acid value titration method described above. The temperature was adjusted as necessary to 82° C. via indirect steam coil heating and the precipitation step was initiated. The 150 liter reactor was agitated via the main tank agitator.

The main agitator was left on and a simultaneous addition precipitation step was started. 30.8 liters of sodium silicate and 1.8 liters of sulfuric acid were added simultaneously over a period of 70 minutes. The sodium silicate was added via an open tube near the bottom of the tank at a rate of 440 ml/min. and the sulfuric acid was added directly above the secondary high-speed mixer blades. The acid addition rate averaged 25.7 ml/min. over the course of the 90 min. simultaneous addition step.

At the end of the simultaneous addition step, a 90-minute age step was begun. A batch pH of 9.0 was measured. 0.18 g of Agefloc, a cationic flocculant solution (WT-40P with 40 weigth % active flocculant, purchased from Ciba Specialty Chemicals), were added per liter of slurry in the reactor. The secondary high speed agitator was turned off after completion of the addition of flocculant, and the remainder of the 90 minute aging step was completed. During this age step the main agitator was left on and the temperature was maintained at 82° C.

After the age step was completed, 240 ml of sulfuric acid were added at a rate of 25.7 ml/min. to reach a final batch pH of 4.2. After reaching the final batch pH, 225 g of ammonium stearate, a 33% active AMS-water emulsion from Bradford Soap Works (AMS), was poured in the top of the reactor.

50 liters of slurry were removed from the reactor and placed on five 50 cm wide Buchner funnels, 10 liters of slurry per funnel and each funnel was washed with four 2.5 liter water washes. After filtering and washing the slurry on the Buchner funnels, the slurry was in cake form and was referred to as filter cake. The resulting filter cake had a solids content of 16.9 wt. %.

Example 5b (3% Ammonium Stearate Treated Sample)

Sample 5b was prepared using the procedure described above for Example 5a, with the following exceptions. During the simultaneous addition step, the sodium silicate was added at a rate of 449 ml/min instead of 440 ml/min; the batch pH measured at the end of the simultaneous addition step was 9.1 instead of 9.0; and 20 ml of sulfuric acid were added to bring the batch pH to 9.0; after the final batch pH was adjusted to 4.2, the amount of ammonium stearate emulsion added was 686 g rather than 225 g to give a treatment level of 3% for the batch instead of 1%.

Filter cake from Examples 5a and 5b were batch dried in a custom-made rotary dryer with inside dimensions of 122 cm in length and 19 cm in diameter. 8 Kg of filter cake was placed in the dryer for each batch. The dryer was heated electrically, the inner shell temperature target was 150° C. during drying and the speed of rotation was 5 RPM. There was an air sweep of 20 liter per minute to remove the moisture. The material was dried until the filler moisture content reached <6.0 wt. %.

After drying, both samples were hammer milled to a median particle size within the range of 19-20 micrometers. The dried, hammer milled treated filler samples (5a and 5b) were extruded into battery separators using formulation #2 listed in Table 6 and the resulting battery separators were tested for electrical resistance and puncture resistance using the procedures described above. The results are given in Table 10.

The dried, hammer milled treated filler samples (5a and 5b) were tested for 5-point BET surface area and CTAB surface area. ATD testing of both examples was done on pellet samples. The results are shown in Table 11.

Example 6

67.5 liters of water were added to the 150 liter reactor tank and heated to 84° C. via indirect steam coil heat. 2.5 liters of sodium silicate were added at a rate of 391 ml/min. to achieve a target $Na_2O$ concentration of 2.5 g/l $Na_2O$ and an acid value of 7.5. The $Na_2O$ concentration and acid value were con-firmed by titrating the sodium silicate/water mixture using the $Na_2O$ titration method and acid value titration method described above. The temperature was adjusted as necessary to 84° C. via indirect steam coil heating and the precipitation step was initiated. The 150 liter reactor was agitated via the main tank agitator.

The main agitator was left on and a simultaneous addition precipitation step was started. 35.2 liters of sodium silicate and 2.04 liters of sulfuric acid were added simultaneously over a period of 90 minutes. The sodium silicate was added via an open tube near the bottom of the tank at a rate of 391 ml/min. and the sulfuric acid was added directly above the secondary high speed mixer blades. The acid addition rate averaged 22.7 ml/min. over the course of the 90 min. simultaneous addition step.

At the end of the simultaneous addition step, a 90 minute age step was begun. A batch pH of 9.1 was measured and an additional 19 ml of sulfuric acid were added at a rate of 22.7 ml/min. to reach a pH of 9.0. The secondary high speed agitator was turned off. 21 g of Agefloc, a cationic flocculant solution (WT-40P with 40 weigth % active flocculant, purchased from Ciba Specialty Chemicals), was diluted with 100 ml of water and poured into the aging slurry. The 90 minute aging step was then completed. During this age step the main agitator was left on and the temperature was maintained at 84° C.

After the age step was completed, 251 ml of sulfuric acid were added at a rate of 22.7 ml/min. to reach a final batch pH of 4.2.

Example 6a (Untreated Control)

50 liters of slurry were removed from the reactor (Example 6) and placed on five 50 cm wide Buchner funnels, 10 liters of slurry per funnel and each funnel was washed with four 2.5 liter water washes. After filtering and washing the slurry on the Buchner funnels, the slurry was in cake form and was referred to as filter cake.

Example 6b (3-(N,N dimethylmyristylammonio)propane Sulfonate Treated Sample)

The remaining slurry from Example 6 was treated with 3 wt. % of 3-(N,N dimethylmyristylammonio)propane sulfonate obtained from Sigma Aldrich (purum ≧98%) based on weight of silica solids. 126 g of 3-(N,N dimethylmyristylammonio)propane sulfonate were dissolved into 1.2 liters of water and poured into the top of the reactor with the main agitator on. The batch was allowed to mix for 10 minutes and the batch pH was measured at 4.2. 50 liters of treated slurry were transferred to five 50 cm Buchner funnels, 10 liters per funnel, and each funnel was washed three times with 2.5 liters of water. After filtering and washing the slurry on the Buchner funnels, the slurry was in cake form and was referred to as filter cake.

Filter cake from Examples 6a and 6b were dried in a custom-made rotary dryer. 19 Kg of filter cake was placed in the dryer for each batch. The dryer was heated electrically, the inner shell temperature set point was 177° C. during drying and the speed of rotation was 8 RPM. There was an air sweep of 40 standard cubic feet per hour (SCFH) to remove the moisture. The material was dried until the filler moisture content reached <6.0 wt. %.

After drying, both samples were hammer milled to a median particle size within the range of 15-18 micrometers. The dried, hammer milled treated filler sample (6b) and untreated control sample (6a) were extruded into battery separators using formulation #1 listed in Table 6 and the resulting samples were tested for electrical resistance and puncture resistance using the procedures described above. The results are given in Table 10.

The dried, hammer milled treated filler sample (6b) and untreated control sample (6a) were tested for 5-point BET surface area and CTAB surface area. ATD testing of both examples was done on pellet samples. The results are shown in Table 11.

Example 7

67.5 liters of water was added to the 150 liter reactor tank and heated to 84° C. via indirect steam coil heat. 2.5 liters of sodium silicate were added at a rate of 391 ml/min. to achieve a target $Na_2O$ concentration of 2.5 g/l $Na_2O$ and an acid value of 7.6. The $Na_2O$ concentration and acid value were confirmed by titrating the sodium silicate/water mixture using the $Na_2O$ titration method and acid value titration method described above. The temperature was adjusted as necessary to 84° C. via indirect steam coil heating and the precipitation step was initiated. The 150 liter reactor was agitated via the main tank agitator.

The main agitator was left on and a simultaneous addition precipitation step was started. 35.3 liters of sodium silicate and 2.01 liters of sulfuric acid were added simultaneously over a period of 90 minutes. The sodium silicate was added via an open tube near the bottom of the tank at a rate of 392 ml/min. and the sulfuric acid was added directly above the secondary high speed mixer blades. The acid addition rate averaged 22.3 ml/min. over the course of the 90 min. simultaneous addition step.

At the end of the simultaneous addition step, a 90 minute age step was initiated. A batch pH of 9.3 was measured and an additional 60 ml of sulfuric acid were added at a rate of 22.3 ml/min. to reach a pH of 9.0. The secondary high speed agitator was turned off. 21 g of Agefloc, a cationic flocculant solution (WT-40P with 40 weigth % active flocculant, purchased from Ciba Specialty Chemicals) were diluted with 100 ml of water was then poured into the aging slurry. The 90 minute aging step was completed. During this age step the main agitator was left on and the temperature was maintained at 84° C.

After the age step was completed, 290 ml of sulfuric acid were added at a rate of 22.3 ml/min. to reach a final batch pH of 4.2.

Example 7a (Untreated Control)

50 liters of slurry were removed from the reactor (Example 7) and placed on five 50 cm wide Buchner funnels, 10 liters of slurry per funnel and each funnel was washed with four 2.5 liter water washes. After filtering and washing the slurry on the Buchner funnels, the slurry was in cake form and was referred to as filter cake.

Example 7b (Hexadecyltrimethylammonium Bromide also Called CetylTrimethylAmmonium Bromide (CTAB) Treated Sample) (Comparative Example)

The remaining slurry from Example 7 was treated with 3 wt. % of CTAB (Fisher Scientific Inc., technical grade) based on weight of silica solids to serve as a Comparative Example. 15 liters of 0.55 wt. % CTAB solution were poured into the top of the reactor with the main agitator on. The batch was allowed to mix for five minutes and the batch pH was measured at 4.6.

60 liters of treated slurry were transferred to six 50 cm Buchner funnels, 10 liters per funnel, and each funnel was washed three times with 2.5 liters of water. After filtering and washing the slurry on the Buchner funnels, the slurry was in cake form and was referred to as filter cake.

Filter cake from Examples 7a and 7b were dried in a custom-made rotary dryer. 19 Kg of filter cake was placed in the dryer for each batch. The dryer was heated electrically, the inner shell temperature set point was 177° C. during drying and the speed of rotation was 8 RPM. There was an air sweep of 40 standard cubic feet per hour (SCFH) to remove the moisture. The material was dried until the filler moisture content reached <6.0 wt. %.

After drying, both samples were hammer milled to a median particle size within a range of 16-19 micrometers. The dried, hammer milled treated filler sample (7b) and untreated control sample (7a) were extruded into battery separators using formulation #1 listed in Table 6 and the resulting battery separators were tested for electrical resistance and puncture resistance using the procedures described above. The results are given in Table 10.

The dried, hammer milled treated filler Comparative Sample (7b) and untreated control sample (7a) were tested for 5-point BET surface area and CTAB surface area. ATD testing of both examples was done on pellet samples. The results are shown in Table 11.

Example 8

67.5 liters of water were added to a 150 liter reactor tank and heated to 84° C. via indirect steam coil heat. 2.5 liters of sodium silicate were added at a rate of 393 ml/min. to achieve a target $Na_2O$ concentration of 2.5 g/l $Na_2O$ and an acid value of 7.5. The $Na_2O$ concentration and acid value were confirmed by titrating the sodium silicate/water mixture using the $Na_2O$ titration method and acid value titration method described at the start of the examples section. The temperature was adjusted as necessary 84° C. via indirect steam coil heating and the precipitation step was initiated. The 150 liter reactor was agitated via the main tank agitator.

The main agitator was left on and a simultaneous addition precipitation step was started. 35.4 liters of sodium silicate and 2.04 liters of sulfuric acid were added simultaneously over a period of 90 minutes. The sodium silicate was added via an open tube near the bottom of the tank at a rate of 393 ml/min. and the sulfuric acid was added directly above the secondary high speed mixer blades. The acid addition rate averaged 22.7 ml/min. over the course of the 90 min. simultaneous addition step.

At the end of the simultaneous addition step, a 90 minute age step was begun. A batch pH of 9.3 was measured and an additional 40 ml of sulfuric acid were added at a rate of 22.7 ml/min. to reach a pH of 9.0. The secondary high speed agitator was turned off. 21 g of Agefloc, a cationic flocculent solution (WT-40P with 40 weigth % active flocculant, purchased from Ciba Specialty Chemicals) were diluted with 100 ml of water and poured into the aging slurry. The 90 minute aging step was then completed. During this age step the main agitator was left on and the temperature was maintained at 84° C.

After the age step was completed, 280 ml of sulfuric acid were added at a rate of 22.7 ml/min to reach a final batch pH of 4.2.

Example 8a (Untreated Control)

50 liters of slurry were removed from the reactor (Example 8) and placed on five 50 cm wide Buchner funnels, 10 liters of slurry per funnel and each funnel was washed with four 2.5 liter water washes. After filtering and washing the slurry on the Buchner funnels, the slurry was in cake form and was referred to as filter cake: The resulting filter cake solids were 16.6 wt. %.

Example 8b (Polyoxyethylene (40) Monostearate Treated Sample)

The remaining 53.5 liters of slurry from Example 8 was treated with 3 wt % of Polyoxyethylene (40) monostearate based on weight of silica solids. The Polyoxyethylene (40) monostearate was obtained from Sigma Aldrich, CAS # 9004-99-3. 126 g of Polyoxyethylene (40) monostearate were mixed with 1.2 liters of water at 60° C. and poured into the top of the reactor with the main agitator on. The batch was allowed to mix for five minutes and the batch pH was measured at 4.1.

50 liters of treated slurry was transferred to five 50 cm Buchner funnels, 10 liters per funnel, and each funnel washed three times with four 2.5 liters of water. After filtering and washing the slurry on the Buchner funnels, the slurry was in cake form and was referred to as filter cake.

Filter cake from Examples 8a and 8b was dried in a custom-made rotary dryer. 19 Kg of filter cake were placed in the dryer for each batch. The dryer was heated electrically, the inner shell set point temperature was 177° C. during drying and the speed of rotation was 8 RPM. There was an air sweep of 40 standard cubic feet per hour (SCFH) to remove the moisture. The material was dried until the filler moisture content reached <6.0 wt. %.

After drying, both samples were hammer milled to a median particle size with the range of 15-16 micrometers. The dried, hammer milled treated filler sample (8b) and untreated control sample (8a) were extruded into battery separators using formulation #1 listed in Table 6 and the resulting battery separators were tested for electrical resistance and puncture resistance using the procedures described above. The results are given in Table 10.

The dried, hammer milled treated filler sample (8b) and untreated control sample (8a) were tested for 5-point BET surface area and CTAB surface area. ATD testing of both examples was done on pellet samples. The results are shown in Table 11.

Example 9

67.5 liters of water were added to the 150 liter reactor tank and heated to 80° C. via indirect steam coil heat. 2.4 liters of sodium silicate were added at a rate of 444.4 ml/min. to achieve a target $Na_2O$ concentration of 2.5 g/l $Na_2O$ and acid value of 7.5. The $Na_2O$ concentration and acid value were confirmed by titrating the sodium silicate/water mixture using the $Na_2O$ titration method and acid value titration method described above. The temperature was adjusted as necessary to 80° C. via indirect steam coil heating and the precipitation step was initiated. The 150 liter reactor was agitated via the main tank agitator.

The main agitator was left on and a simultaneous addition precipitation step was started. 39.1 liters of sodium silicate and 2.38 liters of sulfuric acid were added simultaneously over a period of 90 minutes. The sodium silicate was added via an open tube near the bottom of the tank at a rate of 434.4 ml/min. and the sulfuric acid was added directly above the secondary high speed mixer blades. The acid addition averaged 26.4 ml/min. over the course of the 90 min. simultaneous addition step.

At the end of the simultaneous addition step, a 48 hour age step was begun. A batch pH of 8.7 was measured and an additional 40 ml of sulfuric acid was added at 26.4 ml/min. to reach a pH of 8.5. The secondary high speed agitator was turned off after the pH adjustment and the remainder of the 48 hour aging step was completed. During this age step the main agitator was left on and the temperature was maintained at 80° C. After the age step was completed, the slurry solids content was 14.0 wt. %.

Example 9a (Untreated Control)

48 liters of slurry were removed from the reactor (Example 9) and placed on four 50 cm wide Buchner funnels, 12 liters of slurry per funnel and each funnel washed with four 2.5 liter water washes. After filtering and washing the slurry on the Buchner funnels, the slurry was in cake form and was referred to as filter cake. The resulting filter cake had a solids content of 18.0 wt. %.

Example 9b (Ammonium Stearate Treated Sample)

The remaining 54 liters of slurry from Example 9 were treated with 3 wt. % of ammonium stearate (AMS) based on weight of silica solids. The AMS was obtained from Bradford Soap Works as a 33% active AMS-water emulsion. 687 g of AMS emulsion were poured in over the top of the reactor with the main agitator on. The batch was allowed to mix for 10 minutes and the batch pH was measured at 8.8. 30 ml of sulfuric acid were added at 26.4 ml/min., using the secondary high speed mixer, to bring the pH to 6.1. 48 liters of treated slurry were transferred to four 50 cm Buchner funnels, 12 liters per funnel, and the slurry in each funnel was washed four times with 2.5 liters of water. After filtering and washing the slurry on the Buchner funnels, the slurry was in cake form and was referred to as filter cake. The resulting filter cake had a solids content of 16.5 wt. %

Filter cake from Examples 9a and 9b was batch dried in a custom made rotary dryer with inside dimensions of 122 cm in length and 19 cm in diameter. 8 Kg of filter cake were placed in the dryer for each batch. The dryer was heated electrically, the inner shell temperature set point was 150° C. during drying and the speed of rotation was 5 RPM. There was an air sweep of 20 liter per minute to remove the moisture. The material was dried until the filler moisture content reached <6.0 wt. %.

After drying, both samples were hammer milled to a median particle size within the range of 22-24 micrometers.

The dried, hammer milled treated filler sample (9b) and untreated control sample (9a) were extruded into battery separators which were tested for electrical resistance and puncture resistance using the procedures described above. Battery separator made from filler of Example 9a used formulation #2 listed in Table 6, and battery separator made from filler of Example 9b used the same formula, with the exception that more oil was added (5490 g vs. 4668 g). As a result, less oil was added at the extruder resulting in achieving the sample target oil wt % in the extruded material, 65-67 wt. %. The results are given in Table 10.

The dried, hammer milled treated filler sample (9b) and untreated control sample (9a) were tested for 5-point BET surface area and CTAB surface area. ATD testing of both examples was done on pellet samples. The results are shown in Table 11.

Example 10

67.5 liters of water were added to the 150 liter reactor tank and heated to 80° C. via indirect steam coil heat. 2.4 liters of sodium silicate were added at a rate of 444.4 ml/min. to achieve a target $Na_2O$ concentration of 2.5 g/l $Na_2O$ and acid value of 7.4. The $Na_2O$ concentration and acid value were confirmed by titrating the sodium silicate/water mixture using the $Na_2O$ titration method and acid value titration method described above. The temperature was adjusted as necessary to 80° C. via indirect steam coil heating and the precipitation step was initiated. The 150 liter reactor was agitated via the main tank agitator.

The main agitator was left on and a simultaneous addition precipitation step was initiated. 40 liters of sodium silicate and 2.44 liters of sulfuric acid were added simultaneously over a period of 90 minutes. The sodium silicate was added via an open tube near the bottom of the tank at a rate of 444.4 ml/min. and the sulfuric acid was added directly above the secondary high speed mixer blades. The acid addition rate averaged 27.1 ml/min. during the 90 min. simultaneous addition step.

At the end of the simultaneous addition step, a 100 minute age step was begun. A batch pH of 8.8 was measured and an additional 60 ml of sulfuric acid was added at a rate of 27.1 ml/min. to reach a pH of 8.5. The secondary high speed agitator was turned off at the end of the pH adjustment and the remainder of the 100 minute aging step was completed. During this age step the main agitator was left on and the temperature was maintained at 80° C.

After the age step was completed, 220 ml of sulfuric acid were added at a rate of 26.4 ml/min. to reach a final batch pH of 4.5. The final slurry solids was 13.1 wt. %.

Example 10a (Untreated Control)

40 liters of slurry were removed from the reactor (Example 10) and placed on four 50 cm wide Buchner funnels, 10 liters of slurry per funnel and each funnel washed with four 2.5 liter water washes. After filtering and washing the slurry on the Buchner funnels, the slurry was in cake form and was referred to as filter cake. The resulting filter cake had a solids content of 16.9 wt. %.

Example 10b (Ammonium Stearate Treated Sample)

The remaining slurry from Example 10 was treated with 3 wt. % of ammonium stearate (AMS) based on weight of silica solids. The AMS was obtained from Bradford Soap Works as a 33% active AMS-water emulsion. 858 g of AMS emulsion were poured in the top of the reactor with the main agitator on. The batch was allowed to mix for 10 minutes and the batch pH was measured at 6.4. 20 ml of sulfuric acid were added at a rate of 26.4 ml/min., using the secondary high-speed mixer, to bring the pH to 5.9.

60 liters of treated slurry were transferred to four 50 cm Buchner funnels, 15 liters of treated slurry per funnel, and each funnel was washed four times with 2.5 liters of water. After filtering and washing the slurry on the Buchner funnels, the slurry was in cake form and was referred to as filter cake. The resulting filter cake had solids of 17.5 wt. %.

Filter cake from Examples 10a and 10b was batch dried in a custom-made rotary dryer with inside dimensions of 122 cm in length and 19 cm in diameter. 8 Kg of filter cake was placed in the dryer for each batch. The dryer was heated electrically, the inner shell temperature target was 150° C. during drying and the speed of rotation was 5 RPM There was an air sweep of 20 liter per minute to remove the moisture. The material was dried until the filler moisture content reached <6.0 wt. %.

After drying, both samples were hammer milled to a median particle size within the range of 17-21 micrometers.

The dried, hammer milled treated filler sample (10b) and untreated control sample (10a) were extruded into battery separators using formulation #2 listed in Table 6 and the resulting battery separators were tested for electrical resistance and puncture resistance using the procedures described above. The results are given in Table 10.

The dried, hammer milled treated filler sample (10b) and untreated control sample (10a) were tested for 5-point BET surface area and CTAB surface area. ATD testing of both examples was done on pellet samples. The results are shown in Table 11.

Example 11

67.5 liters of water were added to a 150 liter reactor tank and heated to 84° C. via indirect steam coil heat. 2.5 liters of sodium silicate were added at a rate of 394 ml/min. to achieve a target $Na_2O$ concentration of 2.5 g/l $Na_2O$ and an acid value of 7.5. The $Na_2O$ concentration and acid value were confirmed by titrating the sodium silicate/water mixture using the $Na_2O$ titration method and acid value titration method described above. The temperature was adjusted as necessary to 84° C. via indirect steam coil heating and the precipitation step was initiated. The 150 liter reactor was agitated via the main tank agitator.

The main agitator was left on and a simultaneous addition precipitation step was started. 35.5 liters of sodium silicate and 2.1 liters of sulfuric acid were added simultaneously over a period of 90 minutes. The sodium silicate was added via an open tube near the bottom of the tank at a rate of 394 ml/min. and the sulfuric acid was added directly above the secondary high speed mixer blades. The acid addition rate averaged 23.3 ml/min. over the course of the 90 min. simultaneous addition step.

At the end of the simultaneous addition step, a 90 minute age step was begun. A batch pH of 9.1 was measured and an additional 40 ml of sulfuric acid was added at a rate of 23.3 ml/min. to reach a pH of 9.0. The secondary high speed agitator was turned off. 21 g of Agefloc, a cationic flocculent solution (WT-40P with 40 weigth % active flocculant, purchased from Ciba Specialty Chemicals) was diluted with 100 ml of water was poured into the aging slurry. The 90 minute aging step was then completed. During this age step the main agitator was left on and the temperature was maintained at 84° C.

After the age step was completed, 280 ml of sulfuric acid were added at a rate of 23.3 ml/min. to reach a final batch pH of 4.2.

Example 11a (Untreated Control)

50 liters of slurry were removed from the reactor (Example 11) and placed on five 50 cm wide Buchner funnels, 10 liters of slurry per funnel and each funnel was washed with four 2.5 liter water washes. After filtering and washing the slurry on the Buchner funnels, the slurry was in cake form and was referred to as filter cake. The resulting filter cake solids were 17.4 wt. %.

Example 11b—(Prisavon 1866 Treated Sample)

The remaining slurry from Example 11 was treated with 12 wt. % of Prisavon 1866 based on weight of silica solids. Prisavon 1866 was a tallow/coconut sodium soap obtained from Uniqema Inc. and was a blend of sodium fatty acid salts with $C_{12}$-$C_{18}$ alkyl groups (CAS # 67701-10-4 and 67701-11-5). The Prisavon 1866 contained less than 1% alkyl groups below $C_{12}$ and about 1% above $C_{18}$. 504 g of Prisavon 1866 were mixed with 2.5 liters of water and poured into the top of the reactor with the main agitator on. The batch was allowed to mix for five minutes and the batch pH was measured at 6.6.

50 liters of treated slurry were transferred to five 50 cm Buchner funnels, 10 liters per funnel, and each funnel was washed three times with four 2.5 liters of water. After filtering and washing the slurry on the Buchner funnels, the slurry was in cake form and was referred to as filter cake.

Filter cake from Examples 11a and 11b were dried in a custom-made rotary dryer. 19 Kg of filter cake was placed in the dryer for each batch. The dryer was heated electrically, the inner shell temperature set point was 177° C. during drying and the speed of rotation was 8 RPM. There was an air sweep of 40 standard cubic feet per hour (SCFH) to remove the moisture. The material was dried until the filler moisture content reached <6.0 wt. %.

After drying, both samples were hammer milled to a median particle size within the range of 17-20 micrometers.

The dried, hammer milled treated filler sample (11b) and untreated control sample (11a) were extruded into battery separators using formulation #1 listed in Table 6 and the resulting battery separators were tested for electrical resistance and puncture resistance using the procedures described above. The results are given in Table 10.

The dried, hammer milled treated filler sample (11b) and untreated control sample (11a) were tested for 5-point BET surface area and CTAB surface area. ATD testing of both examples was done on pellet samples. The results are shown in Table 11.

TABLE 10

Properties of Battery Separators Made from Fillers of Examples 5-11

| Filler Example # | Treatment | % treatment | Formulation (Table 6) | ER10* | Puncture oz/mil |
|---|---|---|---|---|---|
| 5a | Ammonium Stearate | 1.0 | 1 | 16.3 | 4.1 |
| 5b | Ammonium Stearate | 3.0 | 1 | 13.5 | 4.0 |
| 6a | None | 0.0 | 1 | 17.7 | 4.4 |
| 6b | 3-(N,N-dimethylmyristyl-ammino)propane sufonate | 3.0 | 1 | 16.0 | 4.8 |
| 7a | None | 0.0 | 1 | 19.2 | 4.3 |
| 7b | CTAB (Comparative Example) | 3.0 | 1 | 24.0 | 4.5 |
| 8a | None | 0.0 | 1 | 18.9 | 4.3 |
| 8b | polyoxyethylene (40) mono stearate | 3.0 | 1 | 20.3 | 4.6 |
| 9a | None | 0.0 | 2 | 14.1 | 2.9 |
| 9b | Ammonium Stearate | 3.0 | 2 | 8.7 | 3.1 |
| 10a | None | 0.0 | 2 | 9.8 | 3.0 |
| 10b | Ammonium Stearate | 3.0 | 2 | 8.8 | 3.2 |
| 11a | None | 0.0 | 1 | 17.2 | 4.1 |
| 11b | Prisavon 1866 | 12.0 | 1 | 9.2 | 3.9 |

*Note - ER10 values given in units of mohm * $in^2$ and standardized to a thickness of 10 mils.

The results of Table 10 revealed that the examples of the present invention when compared to untreated controls showed a decrease in electrical resistivity (ER 10*) and/or an increase in puncture resistance. Typically, when there is an increase in electrical resistivity of 1 unit there is an increase in puncture resistance of at least 0.1 unit. Comparative Example (7b) demonstrated an increase of 4.8 units of ER 10* but only an increase of 0.2 units of puncture resistance instead of at least 0.48 units.

TABLE 11

Treated Filler Physical Properties for Examples 5-11

| Filler Example | Treatment | % Treatment | 5pt.BET surface area ($m^2/g$) | CTAB surface area ($m^2/g$) | Pellet Apparent Tamped Density (g/l) |
|---|---|---|---|---|---|
| 5a | Ammonium Stearate | 1.0 | 137 | 148 | 250 |
| 5b | Ammonium Stearate | 3.0 | 121 | 151 | 203 |
| 6a | None | 0.0 | 146 | 130 | 268 |
| 6b | 3-(N,N-dimethyl-myristylammino) propane sufonate | 3.0 | 109 | 123 | 222 |
| 7a | None | 0.0 | 148 | 124 | 240 |
| 7b | CTAB (Comparative Example) | 3.0 | 110 | 116 | 211 |
| 8a | None | 0.0 | 139 | 123 | 228 |
| 8b | Polyoxyethylene (40) mono stearate | 3.0 | 114 | 123 | 223 |
| 9a | None | 0.0 | 111 | 123 | 283 |
| 9b | Ammonium Stearate | 3.0 | 103 | 143 | 212 |
| 10a | None | 0.0 | 169 | 149 | 287 |
| 10b | Ammonium Stearate | 3.0 | 125 | 155 | 216 |
| 11a | None | 0.0 | 150 | 129 | 244 |
| 11b | Prisavon 1866 | 12.0 | 77 | 144 | 209 |

Examples 12-18

In Examples 12 through 18 the following equipment was used for the synthesis of the treated, coupling, and untreated fillers. The following titration methods were used to determine Na$_2$O strength of the precipitation heel and the acid number of the precipitation heel and during the simultaneous addition.

Equipment: Reactor Tank

The reactor tank was constructed from 304 stainless steel and had a volume of 757 liters. The tank had three 9 cm baffles placed vertically around the inside of the tank for added mixing. Heating was via a series of electrical band heaters located 5 cm from the bottom of the tank to 53 cm from the bottom of the tank. The tank had two agitators. The main agitation was accomplished via two Ekato MIG style blades 60 cm in diameter turning at 100 rpm and a secondary high speed agitator used for acid addition with a single flat disc turbine style blade 10 cm in diameter turning at 1725 RPM. The secondary high-speed agitator was only run when acid was being added to the tank. Both main agitator blades were attached to a single shaft with the lower blade positioned 12 cm from the bottom and the upper blade positioned 37 cm from the bottom of the tank. The shaft was placed in the center of the tank. The secondary agitator blade was located 78 cm from the top and 8 cm from the side.

Titration Methods

Na$_2$O Titration: The titration methods described for Examples 5 through 11 described herein were used.

Example 12

Precipitation 492 liters (L) of water were added to the reactor tank described above and heated to 171° F. (77° C.) under agitation via the main tank agitator. While agitating, 7.22 L of a sodium silicate solution having an Na$_2$O concentration of 75 g/L and a SiO$_2$/Na$_2$O ratio of 3.2 was added at a rate of 2.09 L/min to achieve a target Na$_2$O concentration of 1.09 g/l Na$_2$O and a target acid value of 3.5. The Na$_2$O concentration and acid value were confirmed by titrating the sodium silicate/water mixture using the Na$_2$O and acid value titration methods described above.

To this solution, while maintaining agitation via the main tank agitator and a temperature of 171° F. (77° C.), was simultaneously added 187.78 L of a sodium silicate solution having an Na$_2$O concentration of 75 g/L and a SiO$_2$/Na$_2$O ratio of 3.2 and 12.35 L of concentrated sulfuric acid (96%, 36 N). This simultaneous addition took place over a period of 90 minutes. The sodium silicate was added at an average rate of 2.09 L/min via an open tube at the top of the tank and the sulfuric acid was added at an average rate of 0.137 L/min just above the secondary high-speed mixer blade described above. The secondary high-speed mixer is only run during the addition of the sulfuric acid. Samples were taken periodically during the first 60 minutes of the simultaneous addition to confirm that the target acid value of 3.5, as measured by the acid value titration method described above, was maintained. Small adjustments (+/−0.005 L/min) were made in the sulfuric acid addition rate to compensate for any deviation from the target acid value of 3.5. The sulfuric acid addition was set after this 60-minute period at the rate required to maintain the target acid value of 3.5.

At the end of this simultaneous addition the sodium silicate addition was stopped and the solution temperature set point was increased to 208° F. (97.8° C.). The addition of concentrated sulfuric acid was continued at the rate used during simultaneous addition to drop the slurry pH to 8.5. At a pH of 8.5 both the sulfuric acid addition and the secondary high-speed mixer were stopped. The slurry was aged for a total of 80 minutes after the sodium silicate addition was stopped. The slurry was continuously agitated throughout this aging period via the main tank agitator.

At the end of this 80-minute aging period both concentrated sulfuric acid addition and the high-speed agitator were re-started. The concentrated sulfuric acid addition was above the secondary high-speed mixer blade. The additional concentrated sulfuric acid was added at a rate of 0.137 L/min to drop the pH to 4.2. The untreated filler slurry was continuously agitated throughout the final pH adjustment step via the main tank agitator. At a pH of 4.2 both the concentrated sulfuric acid and the secondary high-speed agitator were stopped. 30 L of the untreated filler slurry was further processed as indicated below to form Example 13a. Another 40 L of this untreated filler slurry was further processed as indicated below to form Example 13b. Another 40 L of this untreated filler slurry was further processed as indicated below to form Example 14a. Another 40 L of this untreated filler slurry was further processed as indicated below to form Example 14b.

Examples 13-18

The rubber evaluation of the treated, coupling, and untreated fillers in Examples 13 through 18 used the compounding ingredients, procedure and testing described below.

Compounding Ingredients

The following compounding ingredients were used in the compounding procedure described below.

Solflex® 1216 solution styrene-butadiene rubber (sSBR), obtained commercially from The Goodyear Tire & Rubber Co.

Budene® 1207 butadiene rubber (BR), obtained commercially from The Goodyear Tire & Rubber Co.

Kadox® surface treated zinc oxide, obtained commercially from Zinc Corporation of America.

Sundex® 8125 aromatic hydrocarbon processing oil, obtained commercially from Sun Company, Inc., Refining and Marketing Division.

Wingstay® 100 antiozonant, a mixture of diaryl p-phenylenediamines, obtained commercially from The Goodyear Tire & Rubber Co.

Rubber grade stearic acid, obtained commercially from C. P. Hall.

Santoflex® 13 antiozonant, described as N-(1,3-dimethylbutyl)-N'-phenyl-p-phenylenediamine, obtained commercially from Flexsys.

Okerin® 7240 microcrystalline wax/paraffin wax blend, obtained commercially from Astor Corporation.

Rubber Makers (RM) sulfur, 100% active, obtained commercially from Taber, Inc. N-tert-butyl-2-benzothiazolesufenamide (TBBS), obtained commercially from Monsanto.

Diphenylguanidine (DPG), obtained commercially from Monsanto.

Compounding Procedure and Testing

The rubber compositions were prepared using the ingredients shown in Formulation Sheet #1 and the procedure described hereinafter.

Preparation of Part A (a Mixture of Ingredients) Used in the Preparation of Part B The following ingredients in amounts of parts per hundred parts of rubber by weight (phr) were added in the order listed to a polyethylene bag held erect in a 500-milliliter (mL) plastic cup to create Part A:

| Material | Amount (phr) |
|---|---|
| Sundex 8125 | 30.0 |
| Zinc Oxide | 2.5 |
| Wingstay 100 | 2.0 |
| Stearic Acid | 1.0 |
| Filler | 12.5 |

Preparation of Part B (FORMULATION SHEET 1)

A 1.89 liter (L) Farrel B Banbury mixer (Model "BR") was used for mixing the ingredients during the first pass (Formulation Sheet 1—Banbury 1$^{st}$ Pass). Immediately prior to adding the batch ingredients to the mixer, 800 grams (g) of CV-60 grade natural rubber was put through the mixer to clean it of any residue of previous runs and increase the temperature to 93° C. (200° F.). After removing the rubber, the mixer was cooled to 65° C. (150° F.) before adding the ingredients to produce the rubber test samples.

The first pass was initiated by adding the rubber, viz., sSBR and BR, to the mixer and mixing for 0.5 minute at 116 rpm. The rotor speed was maintained at 116 rpm and 57.5 phr of treated or coupling filler or 52.5 phr of the untreated filler was added. After a further 1.5 minute, the ram was raised and the chute swept, i.e., the covering on the entry chute was raised and any material that was found in the chute was swept back into the mixer. After one minute Part A was added. The initial addition of treated or coupling filler and the amount of treated or coupling filler contained in part A totals to 70 phr. The initial addition of untreated filler and the amount of untreated filler contained in part A totals to 65 phr. After another minute, the ram was raised and the chute swept. The contents in the mixer were mixed for an additional 2 minutes and reached 150° C. to complete the first pass in the mixer. The rotor speed of the mixer was increased or decreased to achieve the maximum temperature (150° C.) within the specified mixing period.

The removed material was weighed and sheeted in a Farrel 12 inch two-roll rubber mill at 2.032 mm±0.127 mm (0.080 inch±0.005 inch). The resulting milled stock was cut into strips in preparation for the second pass in the mixer.

A minimum of one hour passed between the completion of the first pass in the mixer and the beginning of the second pass to allow the milled stock to cool. As necessary, the aforedescribed cleaning and warming-up procedure using CV-60 grade natural rubber was completed prior to initiating the second pass. The temperature of the mixer was adjusted to 49° C. (120° F.). With the cooling water running, the second pass was initiated by adding the strips of first pass stock to the mixer operating at 77 rpm and the preweighed combination of Santoflex® 13 antiozonant and Okerin® 7240 microcrystalline wax/paraffin wax blend. After 0.5 minutes, the combination of RM Sulfur, TBBS and DPG was added. After a further 1.5 minutes, the ram was raised and the chute swept. The second pass was completed by mixing the stock an additional 2.0 minutes while maintaining a target temperature of 125° C. (257° F.). After completing the second pass, the temperature of the material was determined with a thermocouple to verify that it did not exceed 125° C.

| FORMULATION SHEET 1 ||||
|---|---|---|---|
| Min | Temp | | phr |
| | | Banbury (1st Pass) | |
| 0 | | Solflex 1216 | 70.0 |
| " | | Budene 1207 | 30.0 |
| 0.5 | | Treated or Coupling Filler | 57.5 or 0 |
| " | | Untreated Filler | 0 or 52.5 |
| 3 | | Part A | 48 |
| 5 | 150° C. | DUMP | |
| | | MB TOTAL: | 205.5 |
| | | BANBURY (2$^{nd}$ Pass) | |
| 0 | | MASTERBATCH (MB) | 205.5 |
| " | | Santoflex 13 | 2.0 |
| " | | Okerin 7240 | 1.5 |
| 0.5 | | RM Sulfur | 2.0 |
| " | | TBBS | 3.0 |
| " | | DPG | 0.5 |
| 4 | 125° C. | DUMP | |
| | | SUBTOTAL: | 9.0 |
| | | TOTAL PARTS: | 214.5 |

Part C (Milling and Sheeting of Part B)

A Farrel 12 inch two-roll rubber mill was heated to 60° C. (140° F.). The stock from the second pass of Part B was fed into the running mill with a nip setting of 2.032 mm±0.127 mm (0.080 inch±0.005 inch). The resulting sheet was placed on a flat surface until the temperature of the sheet reached room temperature. Afterwards, the milled sheet was fed into the rubber mill with a nip setting of 3.81 mm±0.51 mm (0.15 inch±0.02 inch). The rolling bank was adjusted, as necessary, to maintain a uniform thickness. The resulting material was subjected to 16 side cuts and then 8 end passes. The rubber mill nip was adjusted to produce a sheet thickness of 2.032 mm±0.127 mm (0.080 inch±0.005 inch). The sheet stock collected off the as placed on a flat clean surface. Using a stencil, a rectangular sample 203.2 mm×152.4 mm (8 inches×6 inches) was cut from the sheet stock. The sample was conditioned, i.e., stored between clean polyethylene sheets and maintained for 15 to 18 hours at a temperature of 23°±2° C., and a relative humidity of 50%±5%.

Part D (Curing of Part C to Make Thin Sheets)

After conditioning, a portion of part C was placed in a 203.2 mm×152.4 mm×2.286 mm (8 inch×6 inch×0.09 inch) standard frame machine steel compression mold having a polished surface. The sample was cured in a 61 centimeter×61 centimeter (24 inch×24 inch) 890 kilonewtons (100 ton) 4-post electrically heated compression press, for T90 (i.e., the time it takes for 90 percent of the cure to occur in accordance with ASTM D-2084) plus 5 minutes at 150° C. (302° F.) under a pressure of 13.79 megapascals (2000 pounds per square inch). The resulting cured rubber sheet was removed from the mold and maintained for a minimum of 15 hours at a temperature of 23°±2° C. (73.4±3.6° F.), and a relative humidity of 50%±5%.

Part E (Curing of Part C to Make Thick Buttons)

A portion of Part C was re-milled on the Farrel 12-inch two-roll rubber mill. Buttons were prepared in accordance with ASTM D 1054-91 (2000). The buttons were cured in a 61 centimeter×61 centimeter (24 inch×24 inch) 890 kilonewtons (100 ton) 4-post electrically heated compression press, for T90 (i.e., the time it takes for 90 percent of the cure to occur, in accordance with ASTM D-2084) plus 10 minutes at 150° C. (302° F.) under a pressure of 13.79 megapascals (2000 pounds per square inch). The resulting cured rubber buttons were removed from the mold and maintained for a minimum of 15 hours at a temperature of 23°±2° C. (73.4±3.6° F.), and a relative humidity of 50%±5%.

Part F (Testing of Parts C, D, and E)

Part C was used to determine Mooney viscosity, Rheometrics dynamic data, and TS2 and TS50.

Mooney viscosity (ML 1+4) was determined using a Mooney Viscometer (MV 2000) with a large rotor in accordance with ASTM D 1646-00 part A.

MDR 2000 related data (TS2 and TC50) was determined using a Moving Die Rheometer (MDR 2000) in accordance with ASTM D 5289-95 (2001).

Rheometrics Dynamic Data (temperature and strain sweep) was determined under parallel plate conditions on a Rheometrics Dynamic Spectrometer 2 (RDS 2). A compounded elastomer sample, that was cured between two parallel plates, was subjected to an oscillatory strain to evaluate viscoelastic properties such as elastic modulus (G'), viscous modulus (G"), and damping (tangent delta=G"/G'). Temperature Sweeps were done between –45° C. to 75° C. at 1 Hz and 2% strain. Strain sweeps were done between 0.1-20% Strain at 1 Hz and 30° C.

The specimen for Rheometrics Dynamic Data was prepared from a portion of Part C which was re-milled to 0.450-in. thickness. A 2-inch by 2-inch block was cut from the sheet. Two cylindrical specimens, 11 mm in diameter, were then cut from the block using an 11-mm punch and a die clicker. The punched rubber specimens were trimmed to 0.86±0.01 grams. The specimens were placed in a 11 mm diameter cavity in a compression mold between parallel plates that were machined aluminum cylinders with a raised cylindrical platform. The parallel plates had a total thickness of 0.188 inches and a diameter of 0.985 inches. The raised cylindrical platform portion of the parallel plates had a thickness of 0.125 inches and a diameter of 0.793 inches. The plates were previously cleaned with actone and primed with Chemlok 205. The specimens were cured at 150° C. for T90 plus 10 minutes under 15 tons of pressure.

Part D was used to test Stress/strain. Stress/Strain testing was performed in accordance with ASTM D 412-98a —Test Method A. Dumbbell test specimens were prepared using Die C. An Instron model 4204 with an automated contact extensiometer for measuring elongation was used. The cross-head speed was 508 mm/min. All calculations were done using the Series IX Automated Materials Testing software supplied by the manufacturer.

Part E was used to test Zwick rebound, DIN abrasion, and dispergrader white area. Zwick rebound was determined using a Zwick 5109 Rebound Resilience Tester in accordance with ASTM D 1054-91 (2000). DIN (abrasion resistant) Index was determined following method B in accordance with ASTM # D 5963-97A (2001).

Dispergrader % white area was determined using a Disper-Grader 1000 NT+(100×). A computer-controlled optical instrument captured the images of the topography of the surface of a freshly-cut cured rubber sample. Undispersed untreated or treated or coupling filler particles were manifested as "bumps" or "divots" in the topography. Image analysis software measured the size of each feature within a field of view of 40 microns×35 microns at a magnification of 100×. The diameters and numbers of particles were grouped into various size ranges and the area % was calculated. The software allowed for the comparison of the treated or coupling or untreated filler dispersion to internal libraries of reference photographs.

Preparation of Examples 13a & 13b

Example 13a was produced by heating 30 L of the slurry produced in Example 12 to 175° F. and filtering on three Buchner funnels. The filter cake in each funnel was washed with 10 liters of water. The resulting filter cake was rotary dried, screened, and equilibrated in a humidity control room as described earlier in Example 1.

Example 13b was produced by heating 40 L of the slurry produced in Example 12 to 175° F. and treated with 320 grams of an emulsion containing 33 percent by weight of ammonium stearate (Bradford Soaps, Inc.) under agitation. The non-coupling filler slurry was aged for 10 min and treated with 118.8 grams of mercaptopropyltrimethoxysilane. The treated filler slurry was further aged for 15 min and neutralized to a pH of 4.6 using concentrated sulfuric acid. 36 liters of the neutralized slurry was filtered in three Buchner funnels. The filter cake in each funnel was washed with 10 liters of water. The resulting filter cake was rotary dried, screened, and equilibrated in a humidity control room as described earlier in Example 1.

The untreated filler of Example 13a and the treated filler of Example 13b, were compounded into rubber and tested for the properties listed in Table 12 using the ingredients and procedures described above. The non-cured and cured compounding results are summarized in Table 12. For compound 6.2 the liquid mercaptosilane was added directly to the Banbury at the 3' mark of the $1^{st}$ pass (essentially at the same time as Part A described above). The amount of the liquid mercaptosilane added directly to the Banbury for compound 6.2 was 4.5% of the silica added which equated to 3.15 phr.

Table 12 compares the compound performance of a treated filler produced by the inventive process (compound 6.3) to both a untreated filler (compound 6.1) and the current practice of adding the untreated filler and the mercaptosilane (MPS) separately to the compound formula (compound 6.2). The results indicate that a rubber compound made with the treated filler produced by the inventive process provided improvements in Mooney viscosity, scorch time, cure time, rebound, stress/strain, dispersion (dispergrader white area), dynamic properties, and DIN abrasion compared to a rubber compound made with the untreated filler or the current practice of adding the untreated filler and the MPS separately to the compound formula. In addition, in the current practice of adding the untreated filler and the mercaptosilane (MPS) separately to the compound formula there is a distinctive offensive odor that is generated by the MPS. The compound using the inventive process did not have this offensive odor.

TABLE 12

|  | Compound # | | |
| --- | --- | --- | --- |
|  | 6.1 Untreated Filler | 6.2 Known Practice Example | 6.3 Inventive Example |
|  | Example 13a | Example 13a | Example 13b |
| Mooney viscosity | | | |
| ML 1 + 4 MU | 142 | 90 | 94 |
| MDR 2000 | | | |
| Scorch Time (TS 2), Minutes | 2.3 | 2.1 | 3.4 |
| Cure Time (TC 50), Minutes | 13.3 | 8.9 | 8.0 |
| Zwick Resiliometer | | | |
| Rebound @ 23° C. | 45 | 53 | 52 |
| Rebound @ 100° C. | 58 | 69 | 70 |
| REBDIFF | 14 | 16 | 17 |

TABLE 12-continued

| | Compound # | | |
|---|---|---|---|
| | 6.1 Untreated Filler | 6.2 Known Practice Example | 6.3 Inventive Example |
| | Example 13a | Example 13a | Example 13b |
| Stress/Strain | | | |
| Breaking Stress, MPa | 20.5 | 19.3 | 21.5 |
| Elongation to Break, % | 850 | 571 | 575 |
| Ratio 300%/100% | 2.5 | 3.7 | 4.0 |
| Dispergrader | | | |
| % White Area | 5.4 | 8.1 | 2.7 |
| Rheometrics Dynamic Data Temperature Sweep, 1 Hz, 2% strain | | | |
| Tangent delta @ 60° C. | 0.103 | 0.097 | 0.075 |
| Tangent delta @ 0° C. | 0.168 | 0.180 | 0.152 |
| Delta Tangent d (0-60° C.) | 0.065 | 0.083 | 0.077 |
| Strain sweep, 30° C., 1 Hz | | | |
| G' @ 0.5%, MPa | 8.782 | 2.666 | 4.097 |
| Delta G', 0.5%-16% | 5.678 | 0.965 | 2.092 |
| DIN Index | 94 | 167 | 124 |

Example 14

Example 14a was produced by heating 40 liters of the slurry produced in Example 12 to 175° F. and treating with 118.8 grams of mercaptopropyltri-methoxysilane. The coupling filler slurry was aged for 15 min. The pH of the coupling filler slurry was increased to 5 using 50% sodium hydroxide solution. The neutralized slurry was filtered in four Buchner funnels. The filter cake in each funnel was washed with 10 liters of water. The resulting filter cake, that had 15.6% by weight of coupling filler, was rotary dried, screened, and equilibrated in a humidity control room as described earlier in Example 1.

Example 14b was produced by heating 40 liters of the slurry produced in Example 12 to 175° F. and treating with 320 grams of an emulsion containing 33 percent by weight of ammonium stearate (Bradford Soaps, Inc.) under agitation. The non-coupling filler slurry was aged for 10 min and treated with 118.8 grams of mercaptopropyltrimethoxysilane. The treated filler slurry was further aged for 15 min and neutralized to a pH of 4.7 using concentrated sulfuric acid. 36 liters of the neutralized slurry was filtered in three Buchner funnels. The filter cake in each funnel was washed with 10 liters of water. The resulting filter cake, that had 15.2% by weight of treated filler, was reslurried with water to form a pumpable slurry and spray dried using a Niro spray drier (Utility Model 5 with Type FU-11 rotary atomizer, Niro Inc.). The spray dried powder was granulated using an Alexanderwerk WP120X40 Roller Compactor with the following conditions: screw speed=55 rpm, roller speed 4.5 rpm, crusher speed=55 rpm, hydraulic pressure=25 bar and screen size=7 mesh.

The coupling filler of Example 14a and the treated filler of Example 14b were compounded into rubber and tested for the properties listed in Table 13 using the ingredients and procedures described for Examples 13 through 18. The non-cured and cured compounding results are summarized in Table 13. Table 13 shows that a rubber compound made with the treated filler produced by the inventive process using a combination of ammonium stearate (AMS)) and mercaptosilane (MPS) (compound 7.2) provided improvements in Mooney viscosity, scorch time, rebound, dynamic properties, and DIN abrasion compared to a rubber compound made with coupling filler which was not treated with a non-coupling material (compound 7.1).

TABLE 13

| Data Summary Table | | |
|---|---|---|
| | 7.1 Comparison Example | 7.2 Inventive Example |
| | Example 14a | Example 14b |
| Mooney | | |
| ML 1 + 4 MU | 130 | 97 |
| MDR 2000 | | |
| Scorch Time (TS 2), Minutes | 3.2 | 3.9 |
| Cure Time (TC 50), Minutes | 9.3 | 9.9 |
| Zwick Resiliometer | | |
| Rebound @ 23° C. | 47 | 51 |
| Rebound @ 100° C. | 62 | 68 |
| REBDIFF | 15 | 16 |
| Rheometrics Dynamic Data Temperature Sweep, 1 Hz, 2% strain | | |
| Tangent delta, 60° C. | 0.099 | 0.093 |
| Tangent delta, 0° C. | 0.169 | 0.166 |
| Delta Tangent delta (0-60° C.) | 0.071 | 0.074 |
| RDS - strain sweep, 30° C., 1 Hz | | |
| Delta G', 0.5%-16% | 3.607 | 2.230 |
| DIN Index: | 131 | 140 |

Example 15

Example 15a was produced by neutralizing 90 liters of 2UF from a precipitation process carried out as in Example 1 with concentrated sulfuric acid to a pH of 6.0, screened through a 100 mesh sieve, and diluted with 225 liters of water. Under agitation, the slurry was heated to 158° F. After 15 minutes, the agitation and heat were shut off and the slurry was allowed to decant overnight. Next morning, the clear supernatant was siphoned off and the settled slurry, that had 5.3 wt % of silica, was filtered in Buchner funnels. Each Buchner funnel contained 10 liters of slurry. The filter cake in each funnel was washed with 5 liters of water. The resulting filter cake, that had 16% by weight of silica, was rotary dried, screened, and equilibrated in a humidity control room as described earlier in Example 1.

Example 15b was produced by neutralizing 90 liters of 2UF from a precipitation process carried out as in Example 1 with concentrated sulfuric acid to a pH of 6.0, screened through a 100 mesh sieve, and diluted with 225 liters of water in a stainless steel reactor. Under agitation, the slurry was heated to 158° F. After 15 minutes, the agitation and heat were shut off and the slurry was allowed to decant overnight. Next morning, the clear supernatant was siphoned off and the settled slurry, that had 5.3 wt % of silica was collected.

TABLE 13

| | Data Summary Table | |
|---|---|---|
| | 7.1 | 7.2 |
| | Example | |
| | Comparison Example 14a | Inventive Example Example 14b |
| Mooney | | |
| ML 1 + 4 MU | 130 | 97 |
| MDR 2000 | | |
| Scorch Time (TS 2), Minutes | 3.2 | 3.9 |
| Cure Time (TC 50), Minutes | 9.3 | 9.9 |
| Zwick Resiliometer | | |
| Rebound @ 23° C. | 47 | 51 |
| Rebound @ 100° C. | 62 | 68 |
| REBDIFF | 15 | 16 |
| Rheometrics Dynamic Data | | |
| Temperature Sweep, 1 Hz, 2% strain | | |
| Tangent delta, 60° C. | 0.099 | 0.093 |
| Tangent delta, 0° C. | 0.169 | 0.166 |
| Delta Tangent delta (0-60° C.) | 0.071 | 0.074 |
| RDS - strain sweep, 30° C., 1 Hz | | |
| Delta G', 0.5%-16% | 3.607 | 2.230 |
| DIN Index: | 131 | 140 |

Example 15

Example 15a was produced by neutralizing 90 liters of 2UF from a precipitation process carried out as in Example 1 with concentrated sulfuric acid to a pH of 6.0, screened through a 100 mesh sieve, and diluted with 225 liters of water. Under agitation, the slurry was heated to 158° F. After 15 minutes, the agitation and heat were shut off and the slurry was allowed to decant overnight. Next morning, the clear supernatant was siphoned off and the settled slurry, that had 5.3 wt % of silica, was filtered in Buchner funnels. Each Buchner funnel contained 10 liters of slurry. The filter cake in each funnel was washed with 5 liters of water. The resulting filter cake, that had 16% by weight of silica, was rotary dried, screened, and equilibrated in a humidity control room as described earlier in Example 1.

Example 15b was produced by neutralizing 90 liters of 2UF from a precipitation process carried out as in Example 1 with concentrated sulfuric acid to a pH of 6.0, screened through a 100 mesh sieve, and diluted with 225 liters of water in a stainless steel reactor. Under agitation, the slurry was heated to 158° F. After 15 minutes, the agitation and heat were shut off and the slurry was allowed to decant overnight. Next morning, the clear supernatant was siphoned off and the settled slurry, that had 5.3 wt % of silica was collected.

89.1 lbs of this slurry was heated to 158° F. and its pH was lowered to 5 by adding concentrated sulfuric acid. 485.4 grams of Octosol 730 was added to the untreated filler slurry with agitation. The non-coupling filler slurry was aged for 15 minutes. To this non-coupling filler slurry, 81.9 grams of mercaptopropyltrimethoxysilane was added with agitation. The treated filler slurry was aged for 15 minutes and its pH was adjusted to 5.6 by adding concentrated sulfuric acid. The neutralized slurry was filtered in Buchner funnels. Each Buchner funnel contained 10 liters of the treated slurry. The filter cake in each funnel was washed with 5 liters of water. The resulting filter cake, that had 17.5% by weight of treated filler, was rotary dried, screened, and equilibrated in a humidity control room as described earlier in Example 1.

Example 15c was produced by neutralizing 90 liters of 2UF from a precipitation process carried out as in Example 1 with concentrated sulfuric acid to a pH of 6.0, screened through a 100 mesh sieve, and diluted with 225 liters of water. Under agitation, the slurry was heated to 158° F. After 15 minutes, the agitation and heat were shut off and the slurry was allowed to decant overnight. Next morning, the clear supernatant was siphoned off and the settled slurry, that had 5.3 wt % of silica was collected.

89.7 lbs of this slurry was heated to 200° F. and its pH was lowered to 5.3 by adding concentrated sulfuric acid. 73.3 grams of Prisavon 1866 was dissolved in 1500 ml of water at 200° F. then added to the untreated filler slurry with agitation. The non-coupling filler slurry was aged for 15 minutes. To this non-coupling filler slurry, 82.5 grams of mercaptopropyltrimethoxysilane was added with agitation. The treated filler slurry was aged for 15 minutes and its pH was adjusted to 6.0 by adding concentrated sulfuric acid. The neutralized slurry was filtered in Buchner funnels. Each Buchner funnel contained 10 liters of the treated filler slurry. The filter cake in each funnel was washed with 5 liters of water. The resulting filter cake, that had 17.5% by weight of treated filler, was rotary dried, screened, and equilibrated in a humidity control room as described earlier in Example 1.

Example 15d was produced using 10 liters of Kason Undersize slurry as described in Example 1. The slurry was heated to 200° F. and treated with 32.4 grams sodium stearate dissolved in 200 ml of water at 203° F. (95° C.) with agitation. After aging for 10 min, 36.4 grams of mercaptopropyltrimethoxysilane was added with agitation. The treated filler slurry was aged for 10 minutes. The pH of the treated filler slurry was lowered to 5.0 by the addition of sulfuric acid. The neutralized slurry was filtered in a Buchner funnel. The filter cake in the funnel was washed with 10 liters of water. The resulting filter cake, that had 23% by weight of treated filler, was reslurried with water to form a pumpable slurry which was spray dried using a Niro spray drier as described above. The spray dried powder was granulated using an Alexanderwerk WP120X40 Roller Compactor with the following conditions: screw speed=55 rpm, roller speed 4.5 rpm, crusher speed=55 rpm, hydraulic pressure=25 bar and screen size=7 mesh.

Example 15e

Another precipitation was done using the same procedure and amounts indicated in Example 12. At the end of the final pH adjustment (from 8.5 to 4.2 in Example 12), 600 kg of this slurry was commixed with 12.9 Kg of a solution that was a mixture of monomethyltrichlorosilane (11.0 kg) and mercaptopropyltri-methoxysilane (1.9 kg). The temperature was 65° C. at the beginning of commixing and 85° C. at the end of this commixing period. The slurry and silane mixture were commixed in a continuous free flowing process using a dynamic mixer (IKA® -Werke gmbh & Co. Process Pilot Machine Type 2000/4). The dynamic mixer contained both a 2P and 2G generator stacked on a central shaft. The shaft speed was 7900 rpm. The slurry was fed to the dynamic mixer at a rate of 8000 g/minute. The silane mixture was injected into this slurry stream prior to the generators at 173 g/minute. This silane mixture modified slurry was fed to a holding tank where it was aged under low agitation for 15 minutes after the last addition of silane mixture modified slurry. The pH of this slurry was <1.0. After aging, the pH was adjusted to 3.5 by adding 16.2 kg of 50% NaOH over 75 minutes. This slurry was filtered using a Perrin Pilot filter press with 20 plates (Model No: Perrin #200 Chambers: 30 inches×20 plates). The filter cake was washed until the discharge water conductivity was <1000 microohms. The filter cake was diluted to 13% solids and liquefied and adjusted to a pH of 6.8 with 2N caustic. The liquefied filter cake was spray dried using a nozzle type spray dryer designed by Spray Dry Systems Inc. This dryer was 4' in diameter and 40' tall. A single nozzle was centered at the top of the dryer. The nozzle had a 0.030 inch (0.0762 cm) orifice and contained a swirl chamber with a 0.078 inch (0.1981 cm) orifice. The slurry was dried using an inlet temperature within the range of 800° F. to 1000° F. (427° C. to 538° C.) and an outlet temperature of 240° F. (116° C.).

These results indicate that the rubber compounds made with treated fillers produced by the inventive process using various fatty acid salts in combination with mercaptosilane provide improvements in Mooney viscosity, scorch time, rebound, stress/strain, and dispersion (dispergrader white area) compared to the rubber compound made by the known practice of adding the untreated filler and the MPS separately to the compound formula (compound 8.1). These results also indicate that the rubber compounds made with the treated fillers produced by the inventive process provide improvements in cure time, stress/strain, and dispersion (dispergrader white area) compared to a rubber compound made with an inorganic oxide modified by a known practice (compound 8.6).

TABLE 14

| | Compound # | | | | | |
|---|---|---|---|---|---|---|
| | 8.1 Known Practice | 8.2 | 8.3 Inventive Examples | 8.4 | 8.5 | 8.6 Known Practice |
| Example | Example 15a | Example 13b | Example 15b | Example 15c | Example 15d | Example 15e |
| Mooney | | | | | | |
| ML 1 + 4 MU | 109 | 94 | 86 | 91 | 73 | 80 |
| MDR 2000 | | | | | | |
| Scorch Time (TS 2), Minutes | 1.9 | 3.4 | 4.6 | 5.2 | 4.7 | 7.1 |
| Cure Time (TC 50), Minutes | 5.4 | 8.0 | 9.2 | 8.1 | 9.4 | 9.7 |
| Zwick Resiliometer | | | | | | |
| Rebound @ 23° C. | 58 | 52 | 52 | 50 | 58 | 55 |
| REBDIFF | 16 | 17 | 19 | 17 | 15 | 20 |
| Stress/Strain | | | | | | |
| Breaking Stress, MPa | 16.3 | 21.5 | 19.2 | 20.6 | 19.5 | 16.2 |
| Elong. to Break, % | 342 | 575 | 412 | 507 | 537 | 382 |
| Ratio 300%/100% | 3.7 | 4.0 | 4.9 | 4.4 | 4.5 | 4.3 |
| Dispergrader | | | | | | |
| % White Area | 5.4 | 2.7 | 1.2 | 1.3 | 1.9 | 6.1 |

The spray dried powder was compacted using an Alexanderwerk granulator having the following conditions: crusher speed=50 rpm, roller speed=9.0 rpm, screen speed=50 rpm and a hydraulic pressure=15 BAR. The screen was removed from the granulator and the granulated product went through a separate scalper unit containing a 20-mesh screen.

The untreated filler of Example 15a and the treated fillers of Examples 15b through 15d, and Example 13b, and inorganic oxide modified by a known practice Example 15e, were compounded into rubber and tested for the properties listed in Table 14 using the ingredients and procedures described for Examples 13 through 18. The non-cured and cured compounding results are summarized in Table 14. For compound 8.1 the liquid mercaptosilane was added directly to the Banbury at the 3' mark of the 1$^{st}$ pass (essentially at the same time as Part A as described in Example 17). The amount of the liquid mercaptosilane added directly to the Banbury for compound 8.1 was 4.4% of the silica added which equates to 3.08 phr.

Table 14 compares the compound performance of the treated fillers produced by the inventive process (compounds 8.2 thru 8.5) with known practices (compounds 8.1 and 8.6).

Example 16

473 L of water were added to the reactor tank described in Example 12 and heated to 175° F. (79° C.) under agitation via the main tank agitator. While agitating, 7.69 L of a sodium silicate solution having an Na$_2$O concentration of 75 g/l and a SiO$_2$/Na$_2$O ratio of 3.2 was added at a rate of 2.22 l/min to achieve a target Na$_2$O concentration of 1.20 g/l Na$_2$O. The acid value was recorded and used as described below during the simultaneous addition. The Na$_2$O concentration and acid value were checked by titrating the sodium silicate/water mixture using the Na$_2$O and acid value titration methods described in Example 12.

To this solution, while maintaining agitation via the main tank agitator and a temperature of 175° F. (79° C.) via electrical heating, was simultaneously added 199.97 L of a sodium silicate solution having an Na$_2$O concentration of 75 g/L and a SiO$_2$/Na$_2$O ratio of 3.2 and 12.64 L of concentrated sulfuric acid (96%, 36 N). This simultaneous addition took place over a period of 90 minutes. The sodium silicate was added at an average rate of 2.22 L/min via an open tube at the top of the tank and the sulfuric acid was added at an average rate of 0.140 L/min above the secondary high-speed mixer blade described in Example 12. The secondary high-speed mixer was only run during the addition of the sulfuric acid. Samples were taken periodically during the first 60 minutes of the simultaneous addition to confirm that the acid value was within +/−0.5 units of the initial value determined prior to this simultaneous addition step. This acid value was measured by the acid value titration method described in Example 12. Small adjustments (+/−0.005 L/min) were made in the sulfuric acid addition rate to compensate for any deviation. The sulfuric acid addition was set after this 60-minute period at the rate required to maintain the acid value within +/−0.5 units of the initial value determined prior to this simultaneous addition step.

At the end of this simultaneous addition the sodium silicate addition was stopped and the solution temperature set point was increased to 203° F. (95° C.). The addition of concentrated sulfuric acid was continued at the rate used during simultaneous addition to drop the solution pH to 8.5. At a pH of 8.5 both the sulfuric acid addition and the secondary high-speed mixer were stopped. The slurry was aged for a total of 80 minutes after the sodium silicate addition was stopped. The slurry was continuously agitated throughout this entire aging period via the main tank agitator.

At the end of this 80-minute aging period both concentrated sulfuric acid addition and the high-speed agitator were re-started. The concentrated sulfuric acid addition was above the secondary high-speed mixer blade. The additional concentrated sulfuric acid was added at a rate of 0.140 L/min to drop to the final target pH of 4.5. The slurry was continuously agitated throughout this entire final pH adjustment step via the main tank agitator. At a pH of 4.5 both the concentrated sulfuric acid and the secondary high-speed agitator were stopped. This slurry was further processed to make Examples 17a through 17c below.

Example 17a, 17b, and 17c

Example 17a was produced by heating 10 liters of the slurry produced in Example 16 to 180° F. and treating with 78.8 grams of an emulsion containing 33 percent by weight of ammonium stearate (Bradford Soaps, Inc.) under agitation. The non-coupling filler slurry was aged for 10 min and then treated with 26 grams of mercaptopropyltrimethoxysilane. The treated filler slurry was further aged for 10 min and neutralized to a pH of 5.5 using concentrated sulfuric acid. The neutralized slurry was filtered in a Buchner funnel. The filter cake in the funnel was washed with 10 liters of water. The resulting filter cake was reslurried with enough water to form a pumpable slurry that was spray dried using a Niro spray drier as described above. The spray dried powder was granulated using an Alexanderwerk WP120X40 Roller Compactor with the following conditions: screw speed=55 rpm, roller speed 4.5 rpm, crusher speed=55 rpm, hydraulic pressure=25 bar and screen size=7 mesh.

Example 17b was produced by heating 20 liters of the slurry produced in Example 16 to 180° F. and treating with 236.4 grams of an emulsion containing 33 percent by weight of ammonium stearate (Bradford Soaps, Inc.) under agitation. The non-coupling filler slurry was aged for 10 min and then treated with 52 grams of mercaptopropyltrimethoxysilane. The treated slurry was further aged for 10 min and neutralized to a pH of 5.5 using concentrated sulfuric acid. The neutralized slurry was filtered in a Buchner funnel. The filter cake in the funnel was washed with 10 liters of water. The resulting filter cake was reslurried with enough water to form a pumpable slurry which was spray dried using a Niro spray drier as described above. The spray dried powder was granulated using a Alexanderwerk WP120X40 Roller Compactor with the following conditions: screw speed=55 rpm, roller speed 4.5 rpm, crusher speed=55 rpm, hydraulic pressure=25 bar and screen size=7 mesh.

Example 17c was produced by heating 20 liters of the slurry produced in Example 16 to 180° F. and treating with 472.8 grams of an emulsion containing 33 percent by weight of ammonium stearate (Bradford Soaps, Inc.) under agitation. The non-coupling filler slurry was aged for 10 min and then treated with 52 grams of mercaptopropyltrimethoxysilane. The treated slurry was further aged for 10 min and neutralized to a pH of 5.5 using concentrated sulfuric acid. The neutralized slurry was filtered in a Buchner funnel. The filter cake in the funnel was washed with 10 liters of water. The resulting filter cake was reslurried with enough water to form a pumpable slurry was spray dried using a Niro spray drier as described above. The spray dried powder was granulated using a Alexanderwerk WP120X40 Roller Compactor with the following conditions: screw speed=55 rpm, roller speed 4.5 rpm, crusher speed=55 rpm, hydraulic pressure=25 bar and screen size=7 mesh.

The treated fillers of Examples 17a through 17c and inorganic oxide modified by a known practice Example 15e were compounded into rubber and tested for the properties listed in Table 15 using the ingredients and procedures described in Example 13. The non-cured and cured compounding results are summarized in Table 15.

Table 15 compares the compound performance of rubber compounds made with the treated fillers produced by the inventive process using various amounts of ammonium stearate (compounds 9.2 through 9.4) to properties of the rubber compound made with inorganic oxide modified by a known practice (compound 9.1). These results indicate that the inventive treated fillers produced using a range of 4% AMS/$SiO_2$ to 12% AMS/$SiO_2$ provided improvements in dispersion (dispergrader white area), delta G', and DIN abrasion compared to inorganic oxide modified by a known practice.

TABLE 15

| | Compound # | | | |
|---|---|---|---|---|
| | 9.1 | 9.2 | 9.3 | 9.4 |
| | | Example | | |
| | Known Practice | Inventive Examples | | |
| | Example 15e | Example 17a | Example 17b | Example 17c |
| Dispergrader | | | | |
| % White Area | 7.5 | 1.8 | 2.1 | 3.4 |
| Rheometrics Dynamic Data (RDS), Strain Sweep, 30° C., 1 Hz | | | | |
| Delta G' (0.5-16%), MPa | 1.456 | 1.003 | 0.701 | 1.104 |
| DIN Index: | 114 | 140 | 149 | 126 |

Example 18

473 L of water were added to the reactor tank described in Example 12 and heated to 179° F. (82° C.) under agitation via the main tank agitator. While agitating, 7.69 L of a sodium silicate solution having an $Na_2O$ concentration of 75 g/l and a SiO$_2$/Na$_2$O ratio of 3.2 was added at a rate of 2.22 l/min to achieve a target Na$_2$O concentration of 1.20 g/l Na$_2$O. The acid value was recorded and used as described below during the simultaneous addition. The acid value was 4.1. The Na$_2$O concentration and acid value were checked by titrating the sodium silicate/water mixture using the Na$_2$O and acid value titration methods described in Example 12.

To this solution, while maintaining agitation via the main tank agitator and a temperature of 179° F. (82° C.), was simultaneously added 199.97 L of a sodium silicate solution having a Na$_2$O concentration of 75 g/L and a SiO$_2$/Na$_2$O ratio of 3.2 and 12.64 L of concentrated sulfuric acid (96%, 36 N). This simultaneous addition took place over a period of 90 minutes. The sodium silicate was added at an average rate of 2.22 L/min via an open tube at the top of the tank and the sulfuric acid was added at an average rate of 0.140 L/min above the secondary high-speed mixer blade described in Example 12. The secondary high-speed mixer was only run during the addition of the sulfuric acid. Samples were taken periodically during the first 60 minutes and the acid value was measured by the acid value titration method described in Example 12. The acid value range drifted down from 4.1 to 3.3 during this period. Small adjustments (+/−0.005 L/min) were made in the sulfuric acid addition rate to minimize the acid value drift. The sulfuric acid addition rate was set after this 60-minute period.

At the end of this simultaneous addition the sodium silicate addition was stopped. The slurry temperature was maintained at 179° F. (82° C.). The addition of concentrated sulfuric acid was continued at the rate used during simultaneous addition to drop the solution pH to 8.5. At a pH of 8.5 both the sulfuric acid addition and the secondary high-speed mixer were stopped. The slurry was aged for a total of 80 minutes after the sodium silicate addition was stopped. The slurry was continuously agitated throughout this entire aging period via the main tank agitator.

At the end of this 80-minute aging period both concentrated sulfuric acid addition and the high-speed agitator were re-started. The concentrated sulfuric acid addition was above the secondary high-speed mixer blade. The additional concentrated sulfuric acid was added at a rate of 0.140 L/min to drop to the final target pH of 4.2. The slurry was continuously agitated throughout this entire final pH adjustment step via the main tank agitator. At a pH of 4.2 both the concentrated sulfuric acid and the secondary high-speed agitator were stopped. The slurry was pumped out and stored in drums for latter use.

379 liters of the above slurry was pumped back into the reactor tank described in Example 12 and heated to 160° F. (71° C.) under agitation via the main tank agitator. Upon sitting the pH had risen to 4.7. The pH was reduced to 4.2 by the addition of concentrated sulfuric acid (96%, 36 N). 3211.5 grams of an emulsion containing 33 percent by weight of ammonium stearate (Bradford Soaps, Inc.) was added to this slurry while agitation was maintained. The ammonium stearate emulsion was added by pouring into the top of the slurry over 5 minutes. The pH was now 6.6. The non-coupling filler slurry was aged for 10 minutes while maintaining agitation. The secondary high-speed mixer described in Example 12 was turned on and 1192.3 grams of mercaptopropyltrimethoxysilane were pumped into the non-coupling filler slurry above the secondary high-speed mixer blade. The mercaptopropyltrimethoxysilane was pumped at a rate of 100 mL per minute. It took 12 minutes to add the mercaptopropyltrimethoxysilane. The secondary high-speed mixer was turned off at the completion of the mercaptopropyltrimethoxysilane addition. The treated filler slurry was aged 10 minutes while maintaining agitation. The pH was re-checked and found to be 6.6. The pH was reduced to 5.0 through the addition of concentrated sulfuric acid (96%, 36 N). This treated slurry was filtered using a Perrin Pilot filter press with 10 plates (Model No: Perrin #200 Chambers: 30 inches×20 plates). The filter cake was washed until the discharge water conductivity was <1000 microohms. The filter cake was diluted to 13% solids and liquefied and adjusted to a pH of 6.0 with 2N caustic. The liquefied filter cake was spray dried using a nozzle type spray drier designed by Spray Dry Systems Inc. This drier was 4' in diameter and 40' tall. A single nozzle was centered at the top of the drier. The nozzle had a 0.030 inch (0.0762 cm) orifice and contained a swirl chamber with a 0.78 inch (0.1981 cm) orifice. The treated slurry was dried using an inlet temperature of 800° F. to 1000° F. (427° C. to 538° C.) and an outlet temperature of 240° F. (116° C.). The spray dried treated powder was granulated using an Alexanderwerk WP120X40 Roller Compactor with the following conditions: screw speed=55 rpm, roller speed 4.5 rpm, crusher speed=55 rpm, hydraulic pressure=25 bar and screen size=7 mesh. This granulated treated powder was Example 18.

The treated filler of Example 18 and the inorganic oxide modified by a known practice of Example 15e were compounded into rubber and tested for the properties listed in Table 16 using the ingredients and procedures described in Example 13. The non-cured and cured compounding results are summarized in Table 16.

Table 16 compares the performance of a rubber compound made with the treated filler produced by the inventive process (compound 10.2) to the performance of a rubber compound made with inorganic oxide modified by a known practice (compound 10.1). The results indicate that the inventive filler provides improvements in Tangent delta at −30° C., which would predict improved ice traction, at equivalent stress/strain properties.

TABLE 16

| | Compound # | |
|---|---|---|
| | 10.1 | 10.2 |
| | Example | |
| | Known Practice Example 15e | Inventive Example Example 18 |
| Stress/Strain | | |
| Breaking Stress, Mpa | 16.6 | 16.3 |
| Elongation to Break, % | 442 | 429 |
| 300% Modulus, Mpa | 9.2 | 9.1 |
| Ratio 300%/100% | 4.7 | 4.8 |
| Rheometrics Dynamic Data, Temperature Sweep, 1 Hz, 2% strain | | |
| Tangent delta, −30° C. | 0.488 | 0.520 |

Example 19

Example 19a was a commercial precipitated silica sold under the tradename Hi-Sil® 170 G-M.

Example 19b was prepared by physically blending a commercial amorphous precipitated silica, Hi-Sil® 170G-D, with Si-69®. The amount of Si-69® used was 8 wt. % of the silica amount used. Si-69® is the trade name for the product sold by Degussa Corporation which is reported to be a mixture of 3,3'-bis(triethoxysilylpropyl)monosulfide, 3,3'-bis(triethoxysilylpropyl)disulfide, 3,3'-bis(triethoxysilylpropyl)trisulfide, 3,3'-bis(triethoxysilylpropyl)tetrasulfide and higher sulfide homologues having an average-sulfide of 3.5. An 8 wt. % loading by weight of silica is a typical amount of Si-69® added to a rubber compound in conjunction with amorphous precipitated silica in another current known practice to achieve improved performance.

Example 19c was prepared by physically blending a commercial amorphous precipitated silica, Hi-Sil® 170G-D, with mercaptopropyltrimethoxysilane. The amount of mercaptopropyltrimethoxysilane used was 3 wt. % of the silica amount used.

Equal amounts of the treated filler from Example 18, the inorganic oxide modified by a known practice from Example 15e, the untreated filler of Example 19a, and the physically blended materials of Examples 19b and 19c were analyzed by GC/MS headspace analysis using the following conditions: Headspace Oven: 150° C., Vial Equilibration Time: 20 minutes, Column: 30 M×0.53 mm ID DB-Wax (1.0 mm film), Temp. Program: 35° C.–5 minutes –10° C./min –220° C.–8.5 minutes. Injection Port Temperature=200° C. The results are summarized in Table 17.

The results indicated that the treated filler produced by the inventive process, Example 18, evolves significantly less alcohol than the known practices of either physically blending the silane and silica, Examples 19b and 19c, respectively. These results also indicate that the treated filler produced by the inventive process, Example 18, evolves essentially the same amount of alcohol as a untreated silica, Example 19a. Finally, these results indicate that the treated filler produced by the inventive process, Example 18, evolves the same amount of alcohol as inorganic oxide modified by a known practice, Example 15e.

TABLE 17

Headspace GC/MS Results

| Example | Description | Methanol (ppm) | Ethanol (ppm) | Total (ppm) |
|---|---|---|---|---|
| 18 | Inventive Process | 16 | 2 | 18 |
| 19a | Untreated Silica | 1 | 6 | 7 |
| 19b | Known Process | 0 | 27204 | 27204 |
| 19c | Known Process | 12779 | 42 | 12821 |
| 15e | Known Process | 9 | 16 | 25 |

We claim:

1. A process for producing treated filler comprising:
   a. treating a slurry comprising untreated filler wherein said untreated filler has not been previously dried, with treating material chosen from anionic, nonionic and amphoteric surfactants and mixtures thereof, wherein the treating material is present in an amount of from greater than 1% to 25% by weight of untreated filler, to produce a treated filler slurry; and
   b. drying said treated filler slurry.

2. The process of claim 1, wherein the untreated filler in (a) is further treated with a coupling material.

3. The process of claim 1 wherein said untreated filler is chosen from aluminum silicate, silica gel, colloidal silica, precipitated silica, and mixtures thereof.

4. The process of claim 1 wherein said treating material is chosen from salts of fatty acids, alkyl sarcosinates, salts of alkyl sarcosinates, and mixtures thereof.

5. The process of claim 2, wherein the coupling material comprises an organosilane of the general formula:

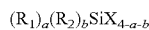

wherein each $R_1$ is independently an organofunctional hydrocarbon radical comprising 1 to 12 carbon atoms, wherein the organofunctional group is vinyl, allyl, hexenyl, epoxy, glycidoxy, (meth)acryloxy, sulfide, isocyanato, polysulfide or mercapto; each $R_2$ is independently a hydrocarbon group having from 1 to 18 carbon atoms or hydrogen, X is each independently halogen or alkoxy radical comprising 1 to 12 carbon atoms, a is 0, 1, 2, or 3; b is 0, 1, or 2; a+b is 1, 2, or 3; with the proviso that when b is 1, a+b is 2 or 3.

6. A process for producing treated filler comprising:
   a. combining alkali metal silicate and acid to form slurry comprising untreated filler wherein said untreated filler has not been previously dried;
   b. treating said slurry with a treating material and, optionally, a coupling material to form treated slurry wherein said treating material is chosen from anionic, nonionic, amphoteric surfactants and mixtures thereof, and wherein said treating material is present in an amount of from greater than 1% to 25% by weight of said untreated filler; and
   c. drying said treated slurry.

7. The process of claim 6 wherein said alkali metal silicate comprises aluminum silicate, lithium silicate, sodium silicate, potassium silicate, and/or mixtures thereof.

8. The process of claim 6 wherein said acid comprises mineral acids, gaseous acids, or mixtures thereof.

9. The process of claim 8 wherein said acid comprises hydrochloric acid, sulfuric acid, phosphoric acid, sulfurous acid, nitric acid, formic acid, acetic acid, carbon dioxide, sulfur dioxide, hydrogen sulfide, chlorine, or mixtures thereof.

10. The process of claim 6 wherein said treating material comprises salts of fatty acids, alkyl sarcosinates, salts of alkyl sarcosinates, or mixtures thereof.

11. The process of claim 1 wherein said untreated filler is precipitated silica.

12. The process of claim 1 wherein said treated filler is characterized by a CTAB surface area greater than its 5-pt BET surface area.

13. The process of claim 1 wherein said treating material is present in an amount of from 2 to 12% by weight of said untreated filler.

14. The process of claim 1 wherein said treated filler is rotary dried.

15. A treated filler material produced by the process of claim 1.

16. A treated filler material produced by the process of claim 6.

17. A rubber compound comprising treated filler produced by the process of claim 2.

18. A tire comprising treated filler produced by the process of claim 2.

19. A treated filler material produced by the process of claim 2.

20. A battery separator comprising a treated filler produced by the process of claim 1.

21. A battery separator comprising a treated silica produced by the process of claim 6.

22. A process for producing treated filler comprising:
   a. treating a slurry which comprises untreated filler which has not been previously dried, with a treating material comprising salts of fatty acids, alkyl sarcosinates, salts of alkyl sarcosinates, or mixtures thereof, and, optionally, a coupling material, said treating material present in an amount of from greater than 1% to 25% by weight of said untreated filler, to produce a treated filler slurry; and
   b. drying said treated filler slurry, wherein the Apparent Tamped Density of said treated filler slurry is less than the Apparent Tamped Density of said untreated filler.

* * * * *